(12) United States Patent
Maksimovic et al.

(10) Patent No.: US 7,456,620 B2
(45) Date of Patent: Nov. 25, 2008

(54) DETERMINING DEAD TIMES IN SWITCHED-MODE DC-DC CONVERTERS

(75) Inventors: Dragan Maksimovic, Boulder, CO (US); Vahid Yousefzadeh, Boulder, CO (US)

(73) Assignee: The Regents of the University of Colorado, Boulder, CO (US)

( * ) Notice: Subject to any disclaimer, the term of this patent is extended or adjusted under 35 U.S.C. 154(b) by 105 days.

(21) Appl. No.: 11/295,147

(22) Filed: Dec. 5, 2005

(65) Prior Publication Data
US 2006/0152204 A1 Jul. 13, 2006

Related U.S. Application Data

(60) Provisional application No. 60/655,233, filed on Feb. 20, 2005, provisional application No. 60/632,804, filed on Dec. 3, 2004.

(51) Int. Cl.
*G05F 1/40* (2006.01)
(52) U.S. Cl. ........................ 323/283; 323/246
(58) Field of Classification Search ......... 323/282–288, 323/225, 237, 222, 244, 299, 246
See application file for complete search history.

(56) References Cited

U.S. PATENT DOCUMENTS 6,294,954 B1    9/2001   Melanson
6,958,592 B2 *  10/2005  Chapuis ..................... 323/246
7,098,640 B2    8/2006   Brown
7,148,669 B2 *  12/2006  Maksimovic et al. ....... 323/283
7,227,476 B1 *  6/2007   Wong ......................... 341/53

OTHER PUBLICATIONS

Krein, Philip T., et al., "Autonomous Control Technique for High-Performance Switches", IEEE Transactions on Industrial Electronics, Jun. 1992, vol. 39, No. 3, pp. 215-222.
Acker, B. et al., "Synchronous rectification with adaptive timing control", IEEE PESC, 1995, pp. 88-95.
Kimbal, J. et al., "Continuous-time optimization of gate timing for synchronous rectification" IEEE Midwest Symp., 1997, pp. 1015-1018.

(Continued)

*Primary Examiner*—Rajnikant B Patel
(74) *Attorney, Agent, or Firm*—Snell & Wilmer, LLP

(57) ABSTRACT

Systems, methods, and apparatuses are disclosed for determining dead-times in switched-mode DC-DC converters with synchronous rectifiers or other complementary switching devices. In one embodiment, for example, a controller for a DC-DC converter determines dead-times for switching devices of a synchronous rectifier or other complementary switching device of the converter in which a dead-time is derived from an output voltage or current that is already sensed and used in the output regulation of the converter. In another embodiment, a controller is provided for controlling a switched-mode DC-DC converter comprising a pair of power switches. The controller comprises an input, a reference generator, a comparator, a compensator, a dead-time sub-controller, and a modulator. In another embodiment, the controller may adjust the dead-times during the operation of the converter to adjust periodically and/or in response to changes in operating conditions. In addition, methods of determining dead-times of control signals for a switched-mode DC-DC converter comprising a pair of power switches and of controlling a DC-DC converter are also disclosed.

37 Claims, 13 Drawing Sheets

OTHER PUBLICATIONS

Lau, W., et al., "An integrated controller for a high frequency buck converter", IEEE PESC, 1997, pp. 246-254.

Kao, James T., et al., "A 175-mV Multiply-Accumulate Unit Using an Adaptive Supply Voltage . . . ", IEEE Journal of Solid-State Circuits, Nov. 2002, vol. 37, No. 11, pp. 1545-1554.

Patella, B.J. et al., "High-Frequency digital PWM controller IC for DC-DC converters", IEEE Transactions on Power Electronics, Jan. 2003, vol. 18, No. 1, pp. 438-446.

Mappus, S., "Predictive gate drive boosts synchronous dc/dc power converter efficiency", Texas Instruments Application Report, SLUA281-Apr. 2003.

Peterchev, A.V. et al., "Digital loss-minimizing multi-mode synchronous buck converter control", IEEE PESC, 2004.

Syed, A. et al., "Digital pulse width modulator architectures", IEEE PESC, 2004.

Trescases, Olivier, et al., "Precision Gate Drive Timing in a Zero-Voltage-Switching DC-DC Converter", Proc. of 2004 Intl. Symposium on Power Semiconductor Devices & ICS, 2004, pp. 55-58.

Yousefzadeh, Vahid, et al., "Digitally Controlled DC-DC Converter for RF Power Amplifier", IEEE, 2004, pp. 81-87.

\* cited by examiner (a)

(b)

DETERMINING DEAD TIMES IN SWITCHED-MODE DC-DC CONVERTERS

CROSS-REFERENCE TO RELATED APPLICATIONS

This application claims the benefit of U.S. provisional application Nos. 60/632,804 entitled "Sensorless Optimization of Dead Times in Switched-mode DC-DC Converters with Synchronous Rectifiers" and filed on Dec. 3, 2004 and 60/655,233 entitled "Sensorless Optimization of Dead Times 2" and filed on Feb. 20, 2005, which are both hereby incorporated by reference as though fully set forth herein.

BACKGROUND OF THE INVENTION a. Field of the Invention

The instant invention relates to DC-DC converters with synchronous rectifiers or other complementary switching devices. In particular, the instant invention relates to a method, system, and apparatus for determining dead times in DC-DC converters with synchronous rectifiers or other complementary switching devices.

b. Background Art

Because of significantly lower conduction losses compared to diode rectifiers, synchronous rectifiers are now used in essentially all low-voltage DC voltage regulators (e.g., DC power supplies), such as power supplies for battery-operated electronics, point-of-load converters, and microprocessor power supplies.

FIGS. 1 and 2, for example, show a synchronous buck DC-DC voltage regulator 100, together with typical control signal waveforms. The voltage regulator 100 includes a switched-mode power converter 102 (in this case, a buck power converter) and a controller 104. The buck power converter 102 shown in FIG. 1, for example, receives an input voltage $V_g$ from a voltage source 106 and provides a regulated output voltage $V_{out}$ to a load 108. The switched-mode power converter 102 includes a pair of complementary power switches. The pair of complementary power switches includes a main power switch 110 and a synchronous rectifier power switch 112. The power switches 110 and 112 are repeatedly turned on and off at a high switching frequency $f_s$ via the controller 104.

The controller 104 shown in FIG. 1 is a standard voltage-mode pulse-width modulated controller that senses an output voltage $V_{out}$ of the converter 102 and compares that output voltage to a voltage reference $V_{ref}$ at a comparator 114 to obtain an error signal e. The comparator 114 provides the error signal e to a compensator 118 (also called an "error amplifier") that amplifies the error signal to produce a duty-cycle command signal $d_c$. The duty-cycle command signal $d_c$ is input to a pulse-width modulator (PWM) 120 that generates a periodic pulse-width modulated waveform g having a constant switching frequency $f_s$ and a duty-cycle determined by the duty-cycle command signal $d_c$. From the periodic pulse-width modulated waveform g, a dead-time circuit 126 generates two gate-drive control signals $g_1$ and $g_2$ to control the on/off states of the complementary power switches 110 and 112 through appropriate gate-drive circuits 122 and 124, respectively, as shown in FIG. 1.

"Dead-times" $t_{d1}$ and $t_{d2}$ are the relatively short time intervals and when both gate-drive signals $v_{g1}$ and $v_{g2}$ are inactive, i.e., when both complementary power switches 110 and 112 are off, as illustrated by the typical waveforms shown in FIG. 2.

Optimum utilization of a synchronous rectifier depends on the ability of the dead-time circuit 126 to optimally adjust the commutating dead-times $t_{d1}$ and $t_{d2}$. Too long dead times (as in the waveforms shown in FIG. 2) result in additional losses due to conduction and reverse recovery of the body diodes of the power switches 110 and 112. Too short (or negative) dead-times may result in simultaneous conduction of the main power switch 110 and the synchronous rectifier power switch 112, resulting in large current spikes through the devices and even more adverse penalties in the converter efficiency.

Various schemes have been proposed to address the desired synchronous rectifier commutation problem, i.e., the determination of dead-times that result in the highest possible power conversion efficiency $\eta = P_{out}/P_{in}$. In the simplest circuit realizations, the dead-times have constant values. In the presence of parameter tolerances, temperature variations or operating point changes, this simplest approach of fixed dead times often yields severely degraded efficiency, especially in converters operating at relatively high switching frequencies (in the hundreds of kHz to megahertz range).

Previously proposed schemes for improved synchronous rectifier commutation have been based on the idea that the synchronous rectifier should commutate as an ideal rectifier; it should be turned on exactly at the time when the voltage across it drops to zero, and it should be turned off exactly at the time when the current through it drops to zero. See, e.g., P. T. Krein and R. M. Bass, "Autonomous control technique for high-performance switches," IEEE Transactions on Industrial Electronics, Vol. 39, No. 3, June 1992, pp. 215-22. Direct implementation of this idea requires sensing the zero-crossing of the voltage v, across the synchronous rectifier, and sensing the threshold-crossing of the gate-drive voltage, which is indicative of the turn-on (or the turn-off) instant. In "adaptive" gate-drive schemes, fast comparators attempt to match the zero-crossing of the voltage $v_s$ and the threshold-crossing instants in each switching cycle, which in practice results in sub-optimal performance because of the comparator delays and sensitivity to parameter and temperature variations.

Better results have been reported with schemes based on the "predictive" gate drive technique such as described in S. Mapus, "Predictive gate drive boosts synchronous dc/dc power converter efficiency," Texas Instruments Application Report, SLUA281, April 2003 (the "Mapus reference"), or with various delay-locked loop circuits such as described in B. Acker et al., "Synchronous rectification with adaptive timing control," IEEE PESC 1995, pp. 88-95; and W. Lav and S. R. Sanders, "An integrated controller for a high frequency buck converter," IEEE PESC 1997, pp. 246-54. These techniques can reduce the dependence on very fast comparators and the sensitivity to parameter or temperature variations. They are still based on sensing the noisy switch voltage $v_s$, and on the ability to accurately detect and control turn-on and turn-off instants, which can be difficult, especially if the gate drivers and the power MOSFETs are not integrated on the same die. Furthermore, such schemes are implemented using analog circuitry, and are available only through specialized, more complex gate drivers such as disclosed in the Mapus reference.

Another scheme for improved synchronous rectifier commutation attempts to increase efficiency directly by minimizing the measured power loss or measured input current. Some such attempts to directly maximize the power conversion efficiency $\eta(t_{d1}, t_{d2})$ on-line via minimizing the measured power loss or measured input current, for example, are described in J. Kimbal, P. T. Krein, "Continuous-time optimization of gate timing for synchronous rectification," IEEE Midwest Symp, 1997, pp. 1015-18; A. V. Peterchev, S. R. Sanders, "Digital loss-minimizing multimode synchronous buck converter control," IEEE PESC 2004, pp. 3694-99; and J. A. Abu-Qahouq, H. Mao, H. J. Al-Atrash, I. Batarseh, "Maximum efficiency point tracking (MEPT) method and dead time control," IEEE PESC 2004, pp. 3700-06. Although possible in principle, these approaches require sensing or computing the input power or losses, which are difficult to accomplish in practice. In the Abu-Qahouq et al. reference, for example, the input current of the converter is sensed and averaged, and an algorithm is used to search for dead-times that minimize the average input current. Actually measuring the input current, however, is often difficult to implement due to noisy input current sensing conditions, lengthy time durations required to average the input currents, complicated high-resolution current sensing circuitry, and sensitivity due to input-current variations caused by disturbances other than dead-times.

BRIEF SUMMARY OF THE INVENTION

It is desirable to be able to determine dead-times that increase the efficiency in switched-mode DC-DC converters with synchronous rectifiers or other complementary switching devices in simpler, faster, and/or more accurate implementations than were previously known. The dead-times of a converter, for example, can be adjusted to values that result in a near-optimum efficiency of the converter.

In one embodiment, for example, a controller for a DC-DC converter determines dead-times for switching devices of a synchronous rectifier or other complementary switching device of the converter in which the dead-times are derived from an output voltage or current that is already sensed and used in the output regulation of the converter. In such an embodiment, the controller provides a "sensorless" implementation to increase the converter efficiency in which no additional sensing beyond that already used to regulate the output of the DC-DC converter is required. Thus, conditions of the DC-DC converter that are already being measured to regulate the output of the converter can be used instead of requiring sensing or calculation of other conditions of the converter that would add additional complexity to the controller. In one particular implementation, for example, the controller comprises an input for receiving a feedback signal from a switched-mode DC-DC converter, a sensorless dead-time sub-controller for determining a pair of dead-time commands based upon the feedback signal, and a control signal generator circuit for generating a pair of control signals to regulate a pair of switches of the DC-DC converter based upon the feedback signal and the pair of dead-time commands. The controller, for example, may comprise a digital, analog, or mixed-signal controller. In such a sensorless implementation, the feedback signal comprises a feedback signal from the switched-mode DC-DC converter used to regulate the output of the converter, such as an output voltage or an output current.

In another embodiment, a controller is provided for controlling a switched-mode DC-DC converter comprising a pair of power switches. The controller comprises an input, a reference generator, a comparator, a compensator, a dead-time sub-controller, and a modulator. The input is adapted to receive a feedback signal from the switched-mode DC-DC converter, and the reference generator is adapted to provide a reference signal. The comparator is adapted to receive the feedback signal and the reference signal and to determine an error signal based upon a difference between the feedback signal and the reference signal. The compensator is adapted to receive the error signal and to provide a time-varying duty-cycle command and a status signal indicative of a direction of change of the feedback signal based upon the error signal. The dead-time sub-controller (e.g., a circuit, a software module, or a control loop implemented within the controller) is adapted to receive the status signal and determine a pair of dead-times based upon the status signal. The modulator is adapted to receive the time-varying duty-cycle command and the pair of dead-times and determine a pair of power switch control signals based upon the time-varying duty-cycle command and the pair of dead times.

The status signal, for example, may comprise a steady-state duty-cycle, an average duty-cycle command, an instantaneous value of the time-varying duty-cycle command such as at a time after the converter has reached a steady-state operation, a signal indicative of the direction of change of the sensed feedback signal such as a signal obtained by linear or non-linear filtering of the error signal, or other suitable signals derived from the error signal.

In yet another embodiment, a controller of a switched mode DC-DC converter with a synchronous rectifier or other complementary switching device is able to adjust the dead-times during the operation of the converter to adjust periodically and/or in response to changes in operating conditions, such as parameter or temperature variations, operating conditions, zero-voltage or hard-switching operation, switching noise, size or type of power devices, or any gate-driver details.

A method of determining dead-times of control signals for a switched-mode DC-DC converter comprising a pair of power switches is also provided. In one embodiment, the method comprises determining a first status signal corresponding to a first dead-time value; adjusting the first dead-time value by a step change to obtain a second dead-time value; determining a second status signal corresponding to the second dead-time value; comparing the first status signal and the second status signal; and, if the second status signal is greater than the first status signal, selecting a dead-time corresponding to the first dead-time value.

In addition to the method of determining dead-times, a method of controlling a DC-DC converter is also provided. In this embodiment, the method comprises: receiving a feedback signal from an output of a switched-mode DC-DC converter; providing an error signal based upon a difference between the feedback signal and a reference signal; determining a time-varying duty-cycle command and a status signal based upon the error signal; determining a pair of dead-times based upon the status signal; and generating a pair of control signals based upon the time-varying duty-cycle and the pair of dead-times.

The foregoing and other aspects, features, details, utilities, and advantages of the present invention will be apparent from reading the following description and claims, and from reviewing the accompanying drawings.

DETAILED DESCRIPTION OF THE INVENTION

Controllers for use in determining dead-times of control signals for switched-mode DC-DC converters comprising synchronous rectifiers or other complementary switching devices are provided. While particular implementations of controllers and DC-DC converters are described in particular detail, one skilled in the art would readily recognize that other types of converters and controllers may be used within the scope of the present invention. For example, a controller may be implemented in (1) any number of hardware implementations using custom digital logic, such as in digital logic implemented on one or more programmable logic chips (e.g. a field programmable gate array (FPGA) or complex programmable logic devices (CPLD)), application specific integrated circuits, or custom digital or mixed-signal controller chips; (2) any number of software implementations, such as using microcontrollers, microprocessors, or digital signal processors (DSP) that execute a dead-time determination method written as software code in an implementation, such as using a general-purpose microcontroller, microprocessor, or DSP or using a microcontroller, microprocessor, or DSP embedded on chips such as described above; or (3) any combination of hardware and software implementations. Likewise, a sub-controller may include separate hardware and/or software implementation and/or may comprise a sub-portion of the controller itself. A sub-controller, for example, may comprise separate or overlapping use of digital logic with the controller and/or may include separate or overlapping software code executed on the same or separate microcontroller, microprocessor, or DSP as the controller.

Exemplary Voltage Regulator

Figure 3:
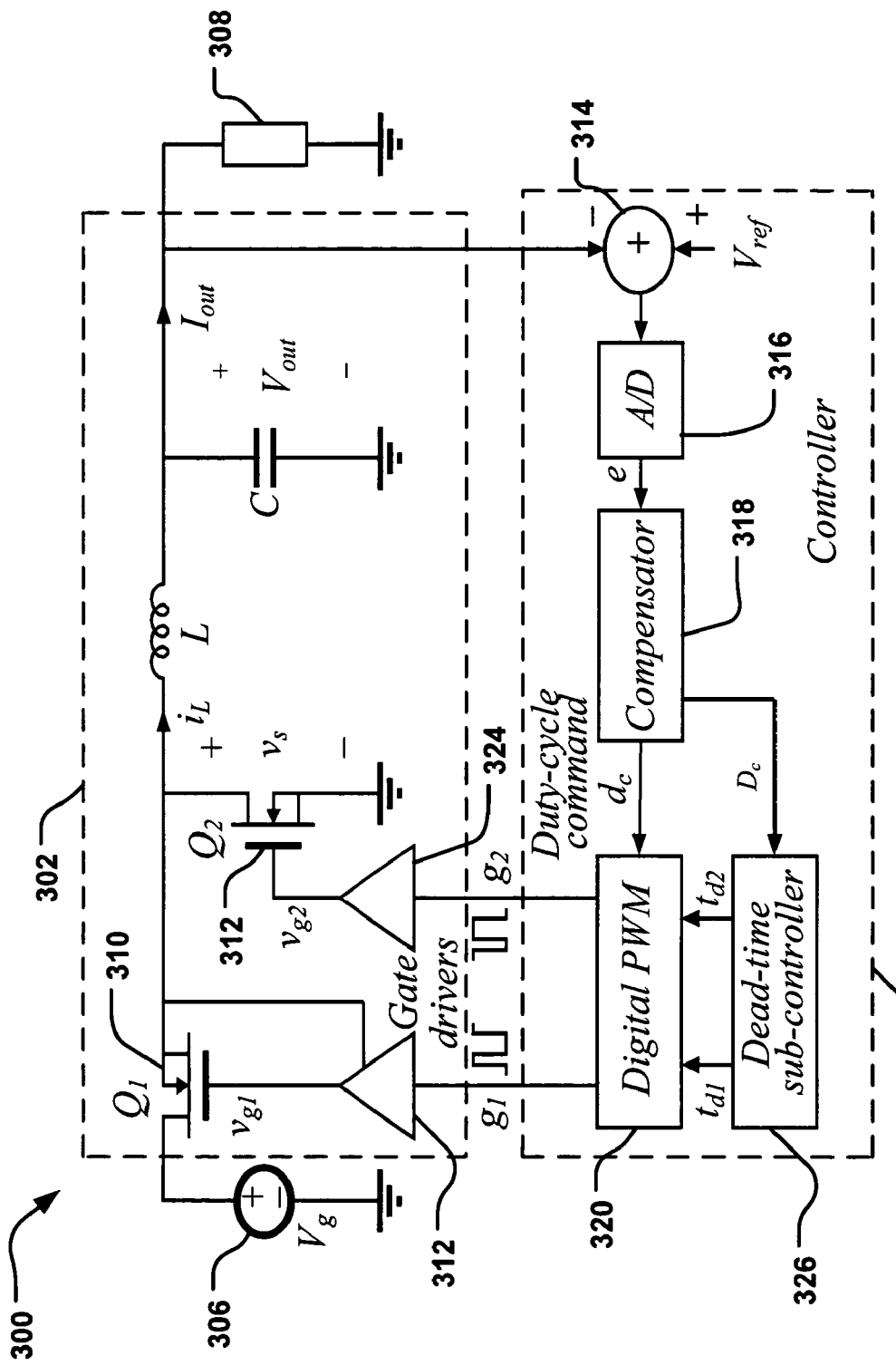
FIG. 3 illustrates an exemplary voltage regulator comprising a voltage converter and a controller that determines dead-times in control signals provided to the voltage converter.

FIG. 3 illustrates an exemplary voltage regulator 300 comprising a switched-mode power converter 302 and a controller 304 that determines dead-times $t_{d1}$ and $t_{d2}$ in control signals $g_1$ and $g_2$, respectively, provided to the converter 302. The voltage regulator 300 receives an input voltage $V_g$ from a voltage source 306 and provides a regulated output voltage $V_{out}$ to a load 308. Although the exemplary voltage regulator 300 shown in FIG. 3 comprises a synchronous buck DC-DC voltage converter, the regulator 300 may comprise any type of switched-mode DC-DC voltage converter having a synchronous rectifier or complementary switching devices, such as a synchronous boost or inverting DC-DC voltage converter, or half-bridge or full-bridge switching converters, or multi-level switching converters. In a full-bridge or multi-level configuration, for example, multiple pairs of complementary switching devices may be similarly controlled. In addition, the converter may be implemented with discrete power MOSFETs (or other types of power semiconductor switches) and conventional (separate gate drivers) or with converters based on power MOSFETs (or other types of power semiconductor switches) with integrated gate drivers. Power MOSFETs, gate drivers, and/or a controller may be fully or partially integrated. A complete switch-mode power converter and a controller may likewise be fully or partially integrated in the same module or package.

Figure 1:
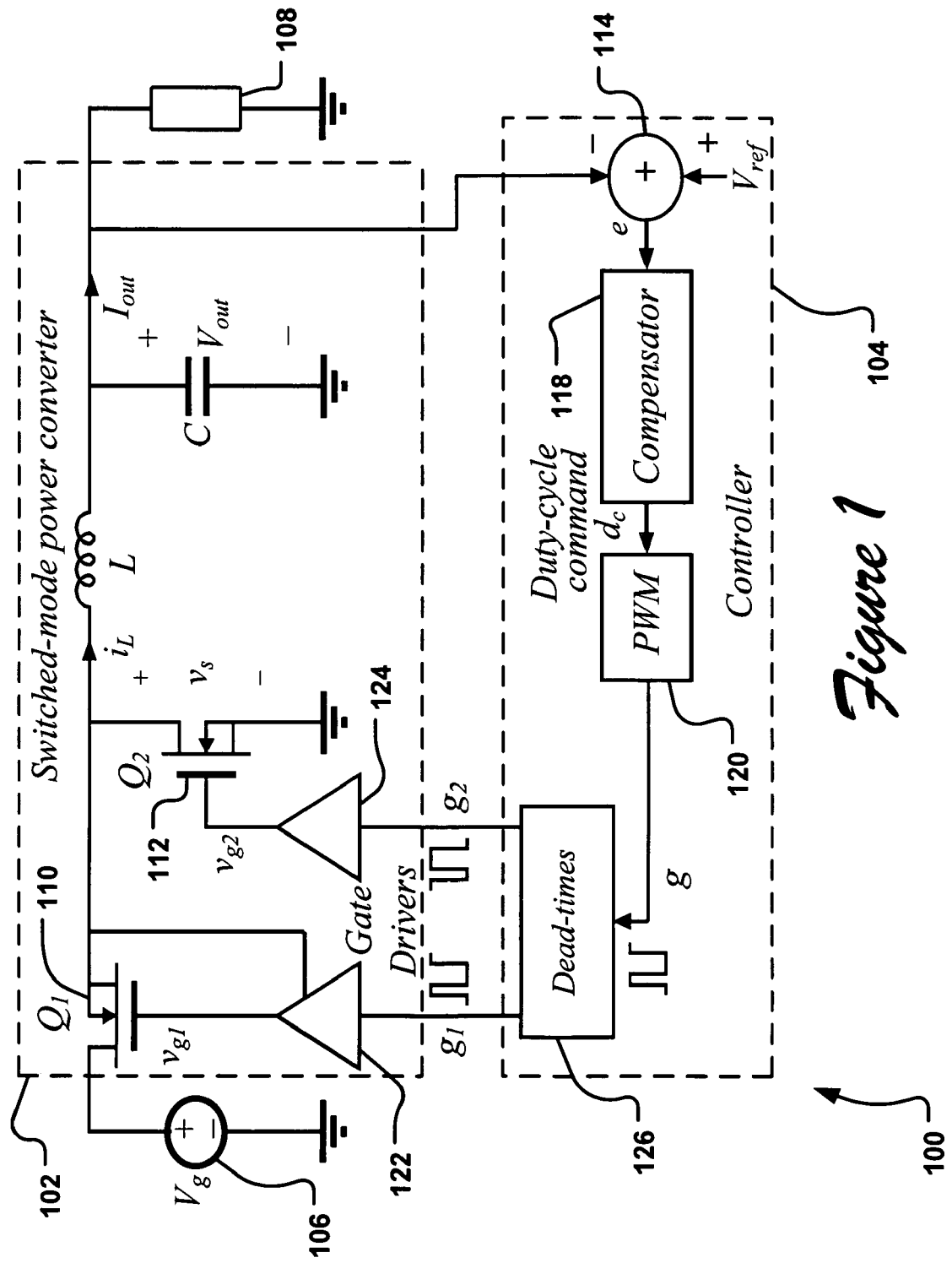
FIG. 1 illustrates a synchronous buck DC-DC voltage converter.
Figure 2:
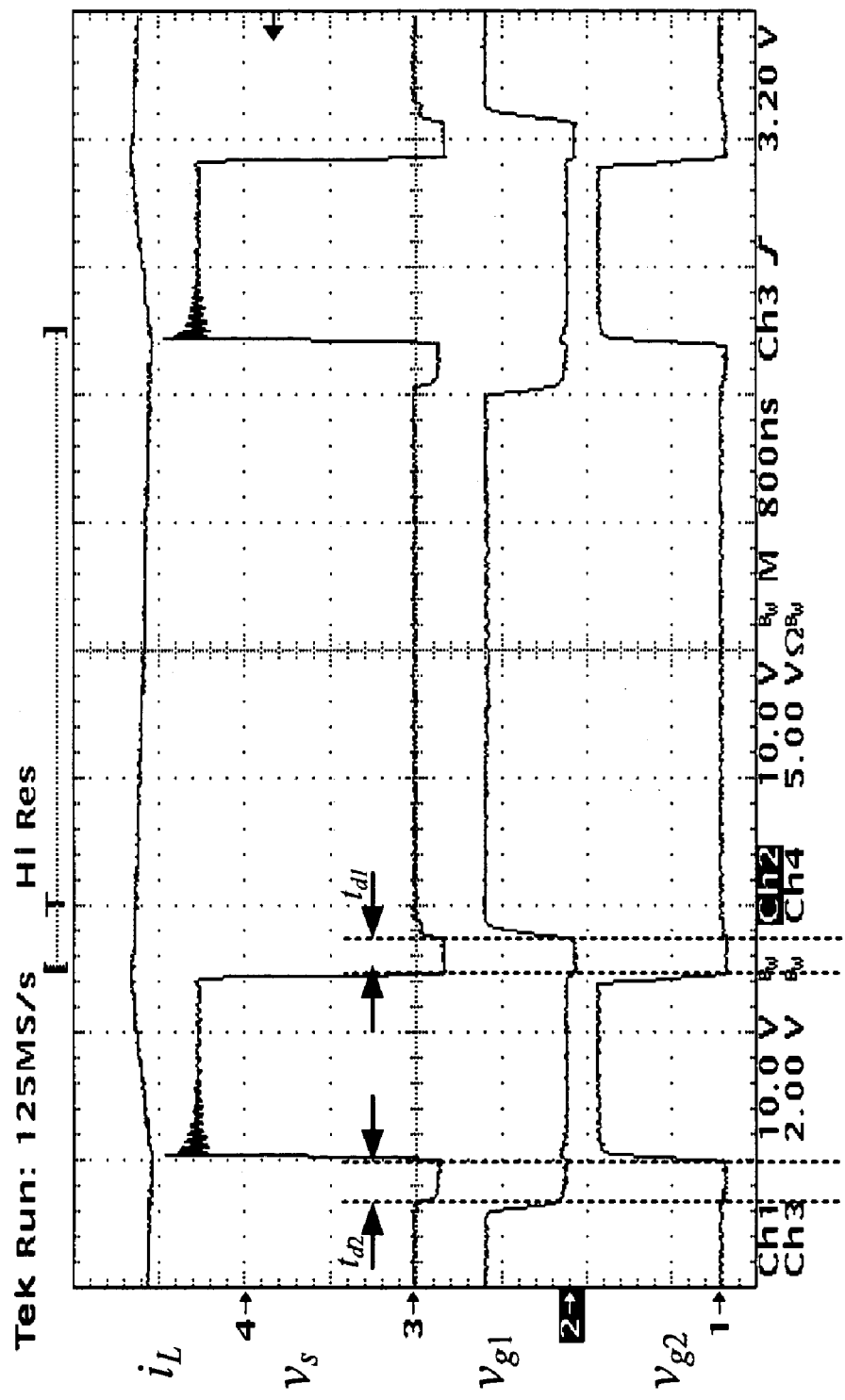
FIG. 2 illustrates exemplary waveforms for signals of the voltage converter of FIG. 1.

The converter 302 shown in FIG. 3 is similar to the converter shown in FIG. 1. As discussed above, the converter 302 comprises a pair of complementary power switches, such as a main power switch 310 and a synchronous rectifier power switch 312. The power switches 310 and 312 are repeatedly turned on and off at a high switching frequency, $f_s$ to regulate the output voltage $V_{out}$ provided to the load 308 under the control of the controller 304.

The controller 304, however, comprises a digital voltage-mode pulse-width modulation (PWM) controller. The controller 304 senses the output voltage $V_{out}$ from the converter and compares the output voltage to a voltage reference $V_{ref}$ via a comparator 314 to obtain an analog error signal. The analog error signal is applied to an analog-to-digital (A/D) converter 316 that converts the analog error signal to a digital error signal e. The digital error signal e is provided to a compensator 318 (also called an "error amplifier") that amplifies the digital error signal e to determine a digital duty-cycle command signal $d_c$ and a steady-state duty-cycle command signal $D_c$. The digital duty-cycle command signal $d_c$ is provided to a pulse-width modulator (PWM) 320 and the steady-state duty-cycle command signal $D_c$ is provided to a dead-time sub-controller 326.

The dead-time sub-controller 326 determines dead times $t_{d1}$ and $t_{d2}$, as described below, for the power switches 310 and 312 of the converter 302, respectively, and provides the dead times $t_{d1}$ and $t_{d2}$ to the digital PWM 320. The digital PWM 320 then generates control signals $g_1$ and $g_2$ having a constant switching frequency, duty-cycles corresponding to the digital duty-cycle command signal $d_c$ received from the compensator 318, and dead-times corresponding to the dead-times $t_{d1}$ and $t_{d2}$ received from the dead-time sub-controller 326. The control signals $g_1$ and $g_2$ are provided to gate drive circuits 322 and 324 to control the on/off states of the power switches 310 and 312, respectively.

Although the voltage regulator 300 shown in FIG. 3 comprises a digital controller 304, the control of the regulator based on determining the dead-times that minimize, or at least decrease, the steady-state duty-cycle command $D_c$ can be implemented using analog, digital, or mixed-signal circuit techniques. The method of determining the dead-times can be fully implemented in controller circuitry, with no additional sensing than is already performed to regulate the output voltage of the converter. In addition, standard conventional gate drivers may be used.

Digital implementation of the controller 304, however, requires relatively small additional digital logic resources to determine the dead-times $t_{d1}$ and $t_{d2}$. No additional components are required for implementation. As shown in FIG. 3, the A/D converter 316, the compensator 318, and the digital PWM 320 are standard blocks in digital PWM controllers. For the purposes of protection, current sharing, or improved dynamic responses, the controller 304 may further comprise sensing a current from the power converter 302. In addition, the proposed method is equally well suited for such current-mode PWM controllers.

Power Efficiency and Dead-Times

The converter power efficiency $\eta = P_{out}/P_g$ is a function of the dead-times $t_{d1}$ and $t_{d2}$, i.e., $\eta = \eta(t_{d1}, t_{d2})$, and is also subject to the output DC voltage regulation requirement $V_{out} = V_{ref}$. Thus, the maximization of the power efficiency of the converter can be expressed by the following formula:

$$\text{Max } \eta(t_{d1}, t_{d2}) | V_{out} = V_{ref} \Rightarrow t_{d1optimum}, t_{d2optimum}.$$

While direct on-line maximization of $\eta(t_{d1}, t_{d2})$ would require sensing or computation of the input power or power losses, the present inventors have recognized that for a given load and subject to the output DC voltage regulation, the dead-times that result in an increased efficiency of the regulator simultaneously result in the minimum steady-state switch duty-cycle command $D_c$, $$\text{Min } D_c(t_{d1}, t_{d2}) | V_{out} = V_{ref} \Rightarrow t_{d1optimum}, t_{d2optimum}.$$

Since the steady-state duty-cycle command $D_c$ or any other suitable status signal derived from the voltage error signal may be readily determined from the output voltage $V_{out}$ of the converter 302 provided to the load 308 without any additional sensing, finding target dead-times may lead to a "sensorless" approach to increasing the converter efficiency in which no additional sensing beyond that already used to regulate the output of the voltage regulator 300 is required.

Figure 4:
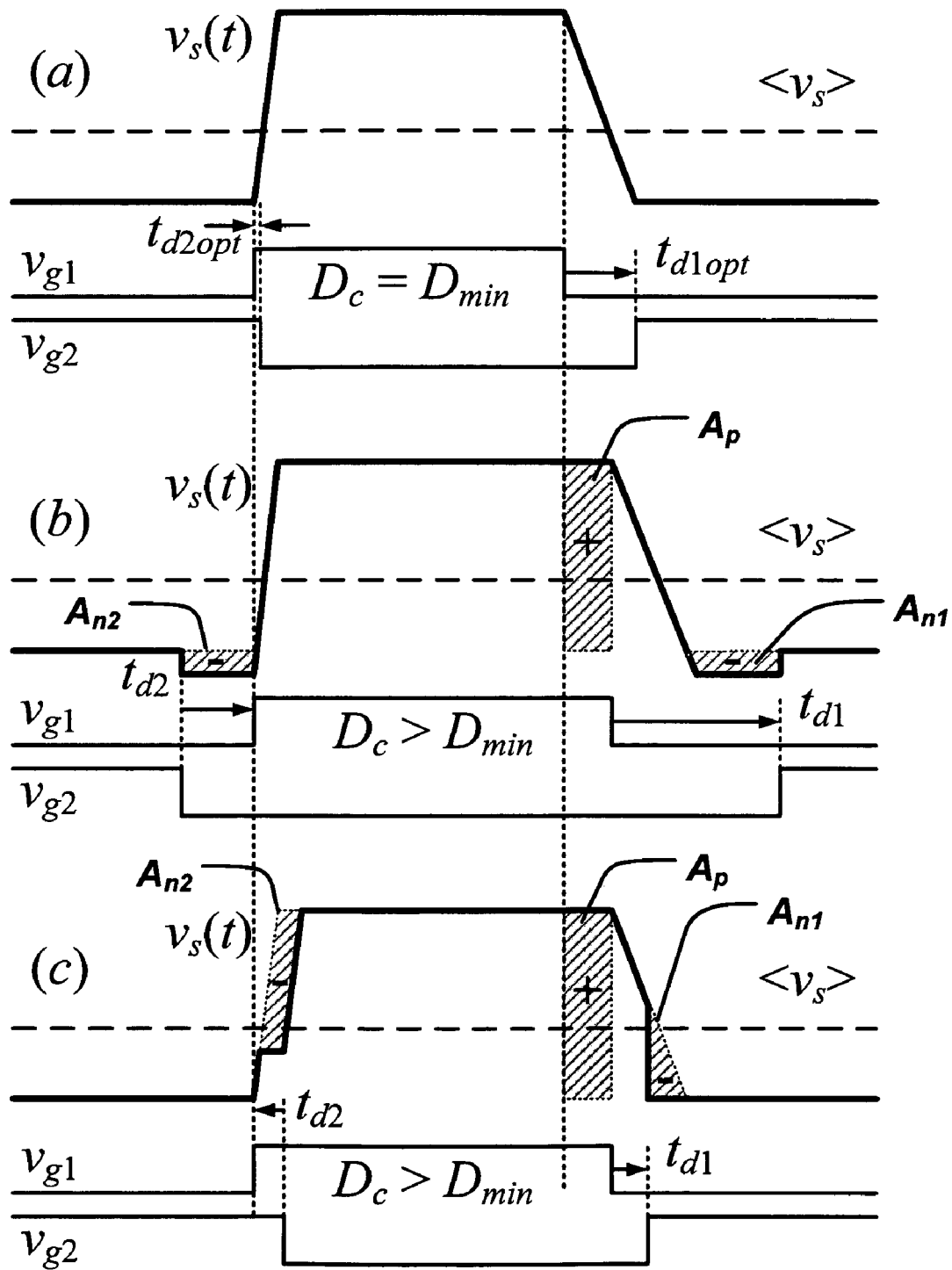
FIGS. 4(a) through 4(c) illustrate exemplary synchronous rectifier power switch voltage waveforms for various gate-drive control signals having different dead-times.

FIGS. 4(a) through 4(c), for example, show a time-varying switch node voltage $v_s(t)$ of the synchronous rectifier power switch 312 and the corresponding gate drive control signals $v_{g1}$ and $v_{g2}$ for optimum dead-times, too long dead-times, and too short dead-times, respectively. As shown in FIG. 4(b), for example, body diode conduction and body diode reverse recovery of the power switches 310 and/or 312 caused by too long dead-times can result in subintervals of negative volt-second areas $A_{n1}$, $A_{n2}$ in the $v_s(t)$ waveform. Too short dead-times, however, may result in current spikes caused by simultaneous conduction of the main power switch 310 and the synchronous rectifier power switch 312. Again, as shown in FIG. 4(c), the current spikes associated with too short dead-times can result in subintervals of negative volt-second areas $A_{n1}$ and $A_{n2}$ of the $v_s(t)$ waveform.

In each instance, the negative areas $A_{n1}$ and $A_{n2}$ contribute to a reduced average switch voltage $<v_s>$. However, the output voltage $V_{out}$, which is related to the switch voltage $v_s(t)$, is precisely regulated such that $V_{out} = <v_s> - R_L I_L = V_{ref}$. Thus, in order to maintain the output voltage $V_{out}$ and the average switch voltage $<v_s>$ constant, the loss in the average voltage $<v_s>$ due to subintervals of negative volt-second areas $A_{n1}$ and $A_{n2}$ of the $v_s(t)$ waveform requires an increase in the steady-state duty-cycle command $D_c$ to compensate for the loss in the average switch voltage $<v_s>$ due to the non-optimum commutation of the power switches 310 and 312. The increased steady-state duty-cycle command $D_c$, in turn, provides a subinterval of positive volt-second area $A_p$ that can be seen in FIGS. 4(b) and 4(c).

The efficient commutation of the power switches 310 and 312 (i.e., the efficient values of the dead-times $t_{d1}$ and $t_{d2}$) are therefore obtained when the steady-state switch duty-cycle command $D_c$ attains the minimum possible value as can be seen in FIG. 4(a). Since the output voltage of the voltage regulator 300 is already precisely regulated based upon the output voltage followed by the large DC gain of the compensator 318, the dead-time sub-controller 326 provides a "sensorless" implementation in which no additional sensing is needed to distinguish efficient versus non-efficient switch commutation. Furthermore, a more precise output voltage regulation (e.g., about 1% or better) directly results in improved sensitivity and performance of the regulator by increasing the ability to approach the actual maximum converter efficiency by minimizing the steady-state duty-cycle command $D_c$.

Figure 5:
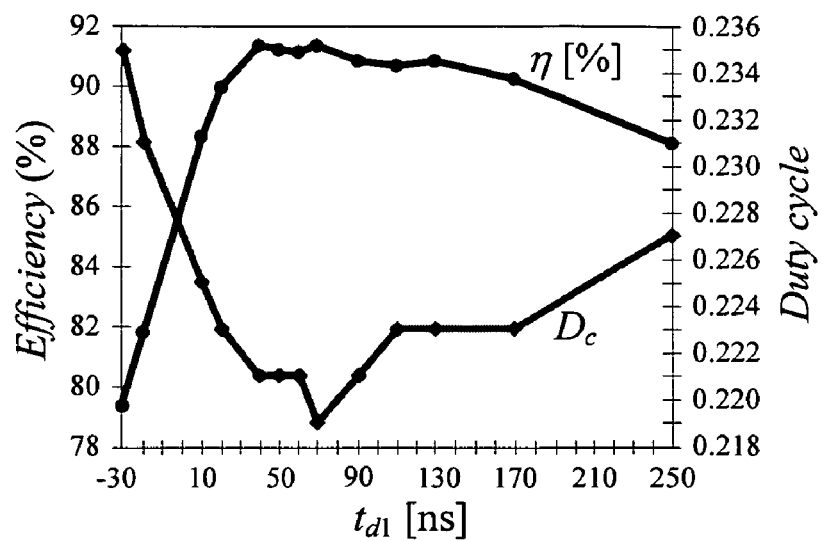
FIG. 5 illustrates an exemplary graph of power efficiency η and steady-state duty-cycle command $D_c$ of a synchronous rectifier DC-DC converter plotted versus a dead-time of a gate-drive control signal of the DC-DC converter.

FIG. 5 illustrates an exemplary measured converter efficiency q and the steady-state duty-cycle command $D_c$ as functions of dead time $t_{d1}$. As shown in FIG. 5, the maximum of the converter efficiency $\eta$ coincides with the minimum of the steady-state duty-cycle command $D_c$. The converter efficiency $\eta$ and the steady-state duty-cycle command $D_c$ shown in the example of FIG. 5 were measured on a 1 volt output voltage DC-DC voltage regulator having a zero-error bin of the A/D converter of 30 mV (i.e., 3% of the nominal output voltage) and a digital controller implemented on a field-programmable gate array (FPGA) implementation that limited the switching to 200 KHz. The practical limitations of the FPGA implementation contribute to the relatively shallow maximum and minimum experimental results shown in FIG. 5. At higher switching frequencies, however, the efficiency would predictably exhibit proportionately stronger dependence on the dead-times, and the efficient commutation would be increasingly important.

Second Exemplary Voltage Regulator

Figure 6:
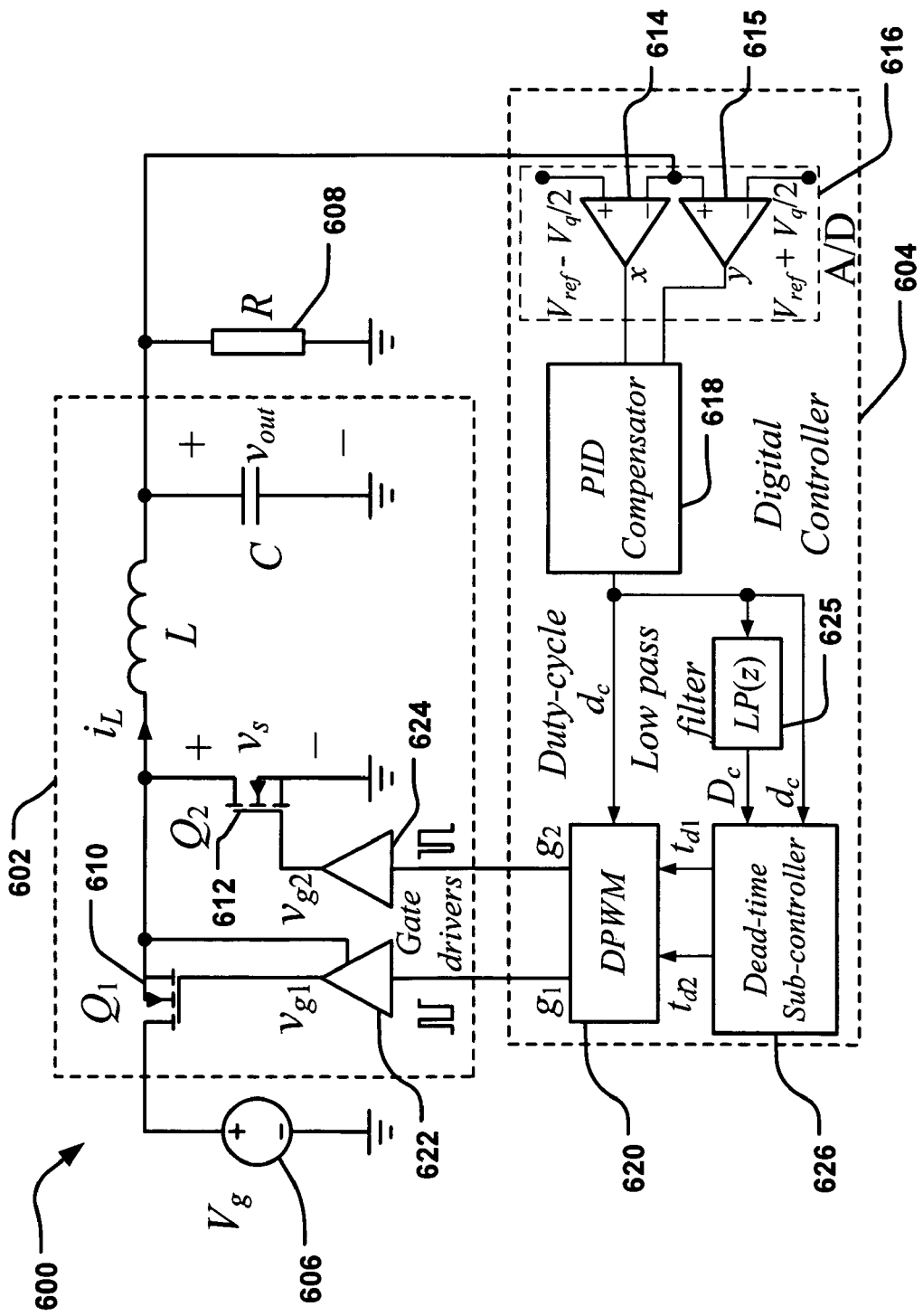
FIG. 6 illustrates another exemplary voltage regulator comprising a voltage converter and a controller that determines dead-times in control signals provided to the voltage converter.

FIG. 6 illustrates an another exemplary embodiment of a voltage regulator 600 comprising a switched-mode power converter 602 and a controller 604 that determines dead-times $t_{d1}$ and $t_{d2}$ in a pair of control signals $g_1$ and $g_2$, respectively, provided to the converter 602. The voltage regulator 600 receives an input voltage $V_g$ from a voltage source 606 and provides a regulated output voltage $V_{out}$ to a load 608. Although the exemplary voltage regulator 600 shown in FIG. 6 comprises a synchronous buck DC-DC voltage regulator, the regulator 600 may comprise any type of switched-mode DC-DC voltage regulator having a synchronous rectifier or other complementary switching devices.

The converter 602 shown in FIG. 6 is similar to the converter shown in FIGS. 1 and 3. As discussed above, the converter 602 comprises a pair of complementary power switches, such as a main power switch 610 and a synchronous rectifier power switch 612. The power switches 610 and 612 are repeatedly turned on and off at a high switching frequency, $f_s$ to regulate the output voltage $V_{out}$ provided to the load 608 under the control of the controller 604.

In this embodiment, the controller 604 comprises a digital voltage-mode pulse-width modulation (PWM) controller. The controller 604 senses the output voltage $V_{out}$ from the converter via a windowed A/D converter 616. The windowed A/D converter 616 comprises a pair of comparators 314 and 315 configured in a three-error bin architecture. Design of such an A/D converter, for example, is described in V. Yousefzadeh, N. Wang, D. Maksimovic, Z. Popovic, "Digitally controlled DC-DC converter for RF power amplifier," IEEE APEC 2004, pp. 81-87, and may, for example comprise a zero-error bin width of $V_q=20$ mV for an A/D converter regulated at $V_{ref}=1$ volt. While this embodiment utilizes the windowed A/D converter 616 comprising two comparators, other implementations may be readily substituted. For example, a windowed A/D converter comprising any number of additional comparators, a differential delay-line A/D converter, or a standard full-range A/D converter may be used.

The error signal output from the A/D converter 616 is received and processed by a proportional-integral-derivative (PID) compensator 618 that provides a duty-cycle command $d_c$ for output regulation of the DC-DC converter 602. In one particular implementation, for example, the PID compensator 618 provides the loop gain of the system with a cross-over frequency $f_c=10$ kHz and a phase margin of greater than 75° at a load of 2.5 A.

The duty-cycle command dc provided by the PID compensator 618 is provided to a digital PWM 620, a low pass filter 625, and a dead-time sub-controller 626. The low pass filter 625 computes a steady-state duty-cycle command value $D_c$ of the duty-cycle command $d_c$, which is then provided to the dead-time sub-controller 626. The low pass filter 625, for example, may comprise a moving-average filter that performs the following function:

$$D_c[n]=(1-\alpha)D_c[n-1]+\alpha d[n].$$

The Z-transform of this formula provides the filter transfer function, $$LP(z) = \frac{D_c}{d_c} = \frac{\alpha z}{z-(1-\alpha)}.$$

For a small value of a, the pole of $(1-\alpha)$ is close to one, which corresponds to a low frequency pole. By rearranging the moving-average function, the value of $D_c$ can be found from the following formula:

$$D_c[n]=D_c[n-1]+\alpha d_c[n]-\alpha D_c[n-1].$$

Where $\alpha=1/2^p$ and p is a positive integer, the multiplication in this formula may be accomplished by a shift operation. The value of p, for example, may be chosen to be 7. In one embodiment, for example, this type of moving-average filtering used to compute the steady-state duty-cycle command $D_c$ may be implemented within a control loop of a controller such as the controller architecture disclosed in H. Peng, D. Maksimovic, "Digital current mode controller for DC-DC converters," IEEE APEC 2005, pp. 899-905, Vol. 2.

Figure 7:
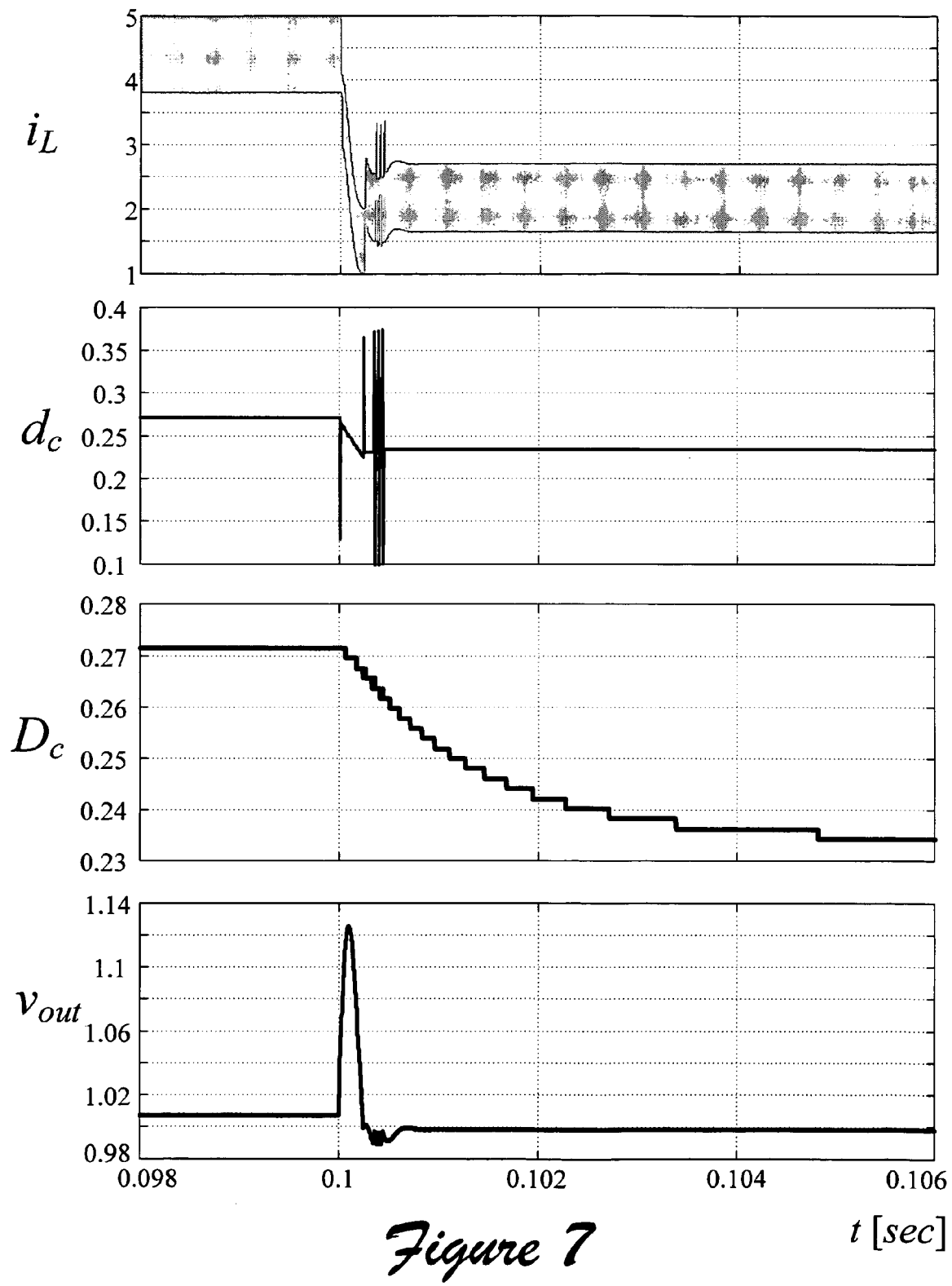
FIG. 7 illustrates exemplary simulation waveforms for a step load change for the voltage regulator shown in FIG. 6.

The converter 602, the PID compensator 618, and the moving-average filter 625 may be modeled, such as via a Matlab/Simulink environment. In this environment, for example, simulation waveforms for a step load change from 4.5 A to 2.3 A are shown in FIG. 7 for the voltage regulator 600 shown in FIG. 6 in which the converter input voltage $V_g=5$ volts, the output voltage $V_{out}=1$ volt, the filter elements L=4.3 µH and C=705 µF, the switching frequency is 200 kHz, and the load current $I_{out}=0\sim5$ A. In this example, it can be seen that the moving-average filter eliminates abrupt changes in the duty-cycle command d and provides a smooth transition of the steady-state duty-cycle command $D_c$.

The dead-time sub-controller 626 determines dead times $t_{d1}$ and $t_{d2}$ for the power switches 610 and 612 of the converter 602, respectively, and provides the dead times $t_{d1}$ and $t_{d2}$ to the digital PWM 620.

The digital PWM 620 then generates control signals $g_1$ and $g_2$ having a constant switching frequency, duty-cycles corresponding to the digital duty-cycle command signal d, received from the compensator 618, and dead-times corresponding to the dead-times $t_{d1}$ and $t_{d2}$ received from the dead-time sub-controller 626. The control signals $g_1$ and $g_2$ are provided to gate drive circuits 622 and 624 to control the on/off states of the power switches 610 and 612, respectively. The digital PWM 620 in the controller 604 shown in FIG. 6 comprises three inputs (i.e., the duty-cycle command $d_c$, the first dead-time command $t_{d1}$, and the second dead-time command $t_{d2}$) and two outputs (i.e., the control signals $g_1$ and $g_2$ for the main power switch 610 and the synchronous rectifier power switch 612, respectively).

Figure 8:
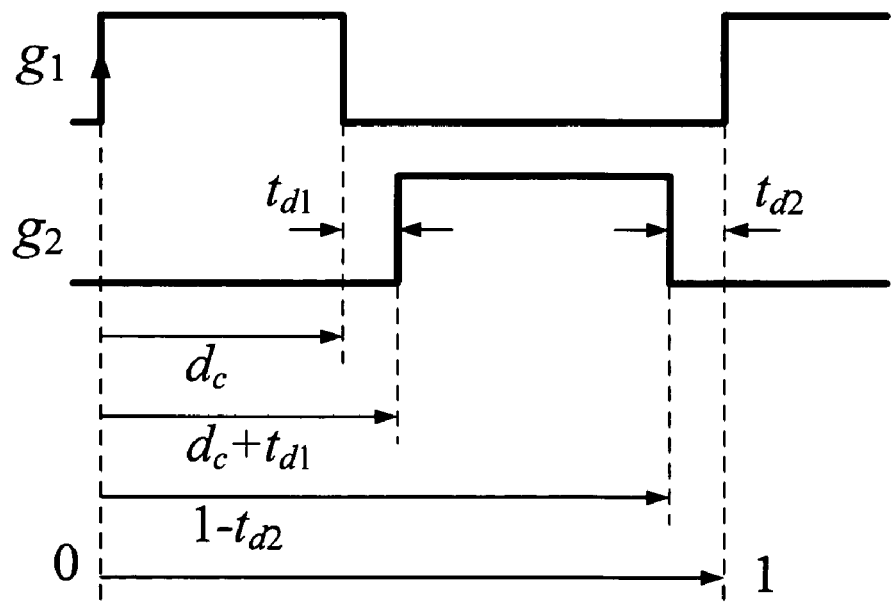
FIG. 8 illustrates exemplary waveforms of a digital pulse-width-modulator of the voltage regulator shown in FIG. 6.

The digital PWM 620, for example, may be executed via a counter-based approach in an FPGA implementation. A nine-bit counter clocked at 100 MHz, for example, may provide output pulses with nine-bit (10 ns) resolution at a switching frequency of 200 KHz. The operation of such a digital PWM is illustrated via waveforms shown in FIG. 8. At the beginning of each switching cycle, corresponding to a zero value of the nine-bit counter, the gate signal $g_1$ is set. When the value of the nine-bit counter equals the value of the duty-cycle command $d_c$, the signal $g_1$ is reset. Therefore, the signal $g_1$ is applied to the main power switch 610 is unaffected by the dead-time commands, and the dead-time commands $t_{d1}$ and $t_{d2}$ are applied to the gate signal $g_2$. As shown in FIG. 8, the second control signal $g_2$ is set when the value of the nine-bit counter is equal to $d_c+t_{d1}$, and is reset when the value of the counter is equal to $1-t_{d2}$. In this embodiment, for example, the dead time values $t_{d1}$ and $t_{d2}$ may comprise positive or negative values.

Determining Dead-Times

Figure 9:
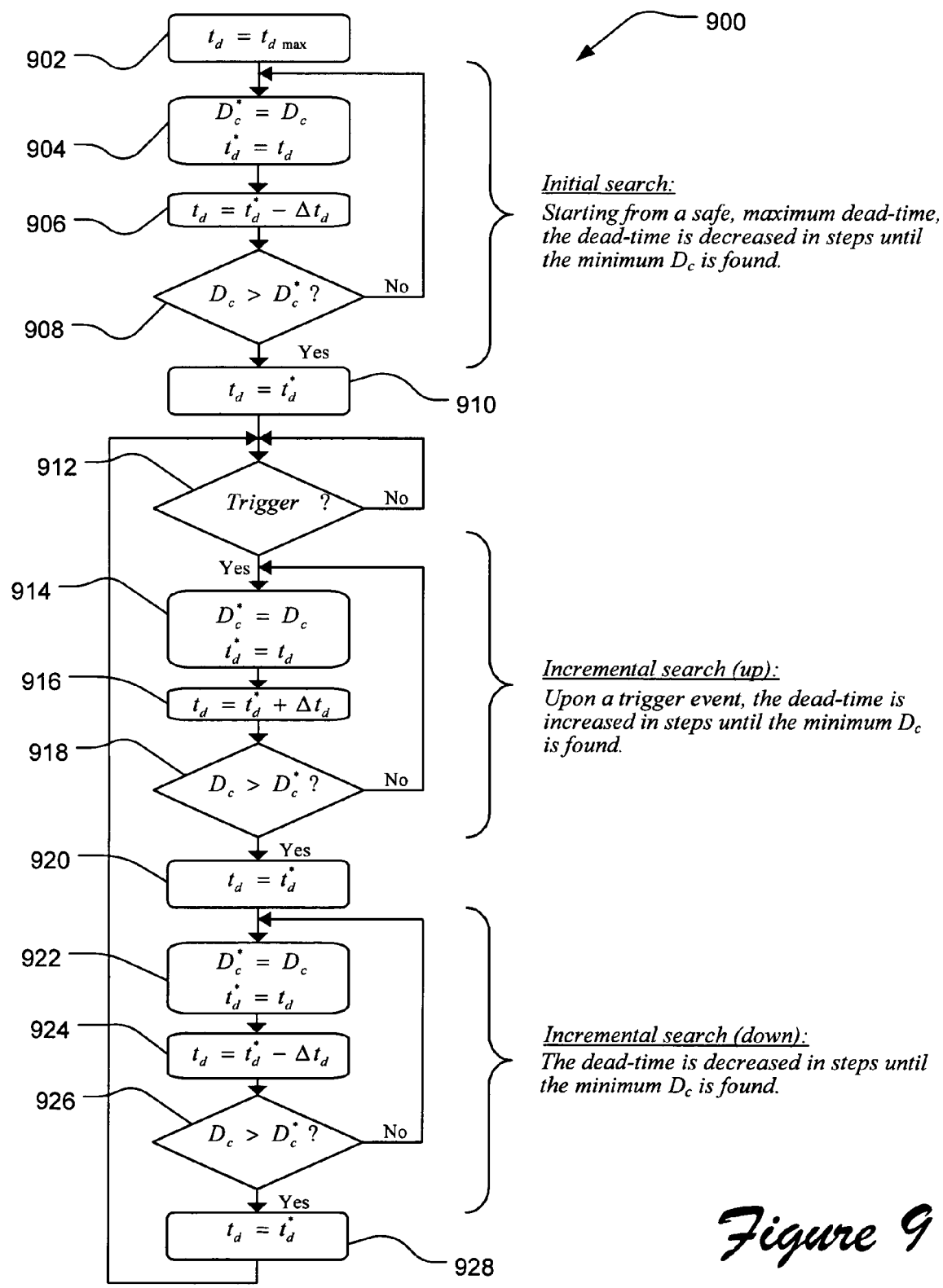
FIG. 9 illustrates a flow diagram of an exemplary method for determining a dead-time.

FIG. 9 shows one exemplary method 900 for implementing the dead-time sub-controllers shown in FIGS. 3 and 6. In this method, a digital implementation of the dead-time determination is performed as a simple search algorithm. This algorithm, however, is merely exemplary, and other implementations (digital, analog, or mixed-signal) or software algorithms could readily be used to determine an efficient dead-time for a particular set of operating parameters of a voltage regulator. In this embodiment, the algorithm shows the determination of a single dead-time $t_d$. The same algorithm can be executed in sequence, in parallel, or interleaved to determine the dead-times $t_d=t_{d1}$ and $t_d=t_{d2}$ for the main power switch and the synchronous rectifier power switch, respectively.

In order to avoid potentially hazardous simultaneous switch conduction, the method first begins the initial search (e.g., upon power up) from a safe, sufficiently long dead-time $t_{dmax}$ by assigning a dead-time variable $t_d=t_{dmax}$ in operation 902. Then, in operation 904, temporary steady-state duty-cycle command $D_c^*$ and dead-time $t_d^*$ variables are assigned the present values of the steady-state duty-cycle command $D_c$ and the dead-time $t_d$, respectively. The dead-time variable $t_d$ is then decremented by a step $\Delta t_d$ in operation 906. The value of the steady-state duty-cycle command $D_c$ for the newly decremented dead-time is then compared to the temporary steady-state duty-cycle command $D_c^*$ variable for the prior dead-time value in decision operation 908.

As can be seen in FIG. 5, the steady-state duty-cycle command $D_c$ decreases from the upper dead-time $t_{dmax}$ until the steady-state duty-cycle command $D_c$ attains its minimum value and then begins to increase. Thus, when the present steady-state duty-cycle command $D_c$ value is greater than the value of the previous steady-state duty-cycle command $D_c^*$ variable, the value stored in the previous steady-state duty-cycle command $D_c^*$ variable represents the minimum steady-state duty-cycle command $D_c$ for the present operating conditions (and the resolution used the sub-controller). Thus, if the present steady-state duty-cycle command $D_c$ value is greater than the value of the previous steady-state duty-cycle command $D_c^*$ variable in decision operation 908, the method continues to assignment operation 910. Otherwise, the method 900 branches back to operation 904 where the temporary steady-state duty-cycle command $D_c^*$ and dead-time td* variables are assigned the present values of the steady-state duty-cycle command $D_c$ and the dead-time $t_d$, respectively, and the dead-time variable $t_d$ is decremented by another $\Delta t_d$ step in operation 906. In assignment operation 910, the value stored in the temporary dead-time $t_d^*$ variable corresponds to an efficient dead-time and is assigned to the dead-time variable $t_d$, which may represent $t_{d1}$ or $t_{d2}$. As described above, the method 900 may be executed in sequence, in parallel, or interleaved to determine each dead-time $t_{d1}$ and $t_{d2}$. Once each dead-time $t_{d1}$ and $t_{d2}$ is determined for the present operating conditions, the dead-time sub-controller provides those dead-times to the digital PWM for use in controlling the voltage regulator.

Since the efficient dead-times for the voltage regulator depend upon operating conditions of the regulator, changes in the operating conditions such as parameter tolerances, temperature variations, or operating point changes for the voltage regulator may cause a change in the efficiency of the dead-times for the regulator. Thus, while the voltage regulator is operating using previously determined dead-times $t_{d1}$ and $t_{d2}$, the method 900 continues to monitor for a trigger condition in operation 912. If no trigger condition is detected, the method continues to wait. If a trigger condition is detected in operation 912, however, the method branches to operation 914 to determine a new set of dead-times $t_{d1}$ and $t_{d2}$. A trigger condition, for example, may be generated at periodic programmed intervals, when a change in the steady-state duty-cycle $D_c$ is detected indicating a change in operating conditions for the voltage regulator, when non-zero errors e are detected indicating a change in operating conditions, when other operating conditions of the voltage regulator are changed, and/or upon a trigger command issued by an external input signal to the controller.

When such a trigger is detected, the controller initiates incremental searches for new dead-times starting from the previously determined dead-times in operation 914. The new incremental searches may, for example, be performed in steps $\Delta t_d$ up and down from the previous dead-times to decrease the time it takes to determine the new value. For example, in operation 914, the method assigns the present values of the steady-state duty-cycle command $D_c$ and the dead-time $t_d$ to the temporary steady-state duty-cycle command $D_c^*$ and dead-time $t_d^*$ variables, respectively. The dead-time variable $t_d$ is then incremented by a step $\Delta t_d$ in operation 916. The step value $\Delta t_d$ by which the dead-time variable $t_d$ is incremented in operation 916 may be the same value or another value as by which the dead-time variable $t_d$ was decremented in operation 906. The value of the steady-state duty-cycle command $D_c$ for the newly incremented dead-time is compared to the temporary steady-state duty-cycle command $D_c^*$ variable for the prior dead-time value in decision operation 918.

Where the dead-time variable is being incremented upward from a previous operating value as shown in FIG. 9, when the new value of the steady-state duty-cycle command $D_c$ is greater than the value stored in the temporary steady-state duty-cycle command variable $D_c^*$, either dead-time value is above an efficient dead-time value and is incrementing in the wrong direction or the value stored in the temporary steady-state duty-cycle command variable $D_c^*$ represents the minimum steady-state duty-cycle command (within the resolution of the sub-controller) for the present operating conditions. Thus, if the present steady-state duty-cycle command $D_c$ value is greater than the value of the previous steady-state duty-cycle command $D_c^*$ variable in decision operation 918, the method continues to assignment operation 920 where the value stored in the temporary dead-time $t_d^*$ variable is assigned to the dead-time variable $t_d$, which may represent $t_{d1}$ or $t_{d2}$. Otherwise, the method 900 branches back to operation 914 where the temporary steady-state duty-cycle command $D_c^*$ and dead-time $t_d^*$ variables are assigned the present values of the steady-state duty-cycle command $D_c$ and the dead-time $t_d$, respectively, and the dead-time variable $t_d$ is incremented by another $\Delta t_d$ step in operation 916.

When the method reaches operation 920, the value stored in the dead-time variable $t_d$, either represents an efficient dead-time value if the upward search was successful or represents a non-efficient dead-time value if the upward search was unsuccessful. The method then continues to operation 922 where the prior operating values of the steady-state duty-cycle command $D_c$ and the dead-time $t_d$ are assigned to the temporary steady-state duty-cycle command $D_c^*$ and dead-time $t_d^*$ variables, respectively. The dead-time variable $t_d$ is then decremented by a step $\Delta t_d$ in operation 924. The step $\Delta t_d$ used in to decrement the dead-time variable may or may not be the same value used in the incrementing operation 916. Likewise, the step change used in the decrementing operation 924 may or may not be the same value used in decrementing operation 906 discussed above. The value of the steady-state duty-cycle command $D_c$ for the newly decremented dead-time is compared to the temporary steady-state duty-cycle command $D_c^*$ variable for the prior dead-time value in decision operation 926. If the present steady-state duty-cycle command $D_c$ value is greater than the value of the previous steady-state duty-cycle command $D_c^*$ variable in decision operation 926, the method continues to assignment operation 928 where the value stored in the temporary dead-time $t_d^*$ variable corresponding to an efficient dead-time is assigned to the dead-time variable $t_d$, which may represent dead-time $t_{d1}$ or $t_{d2}$. Otherwise, the method 900 branches back to operation 922 where the temporary steady-state duty-cycle command $D_c^*$ and dead-time $t_d^*$ variables are assigned the present values of the steady-state duty-cycle command $D_c$ and the dead-time $t_d$, respectively, and the dead-time variable $t_d$ is decremented by another $\Delta t_d$ step in operation 924.

Again, the method 900 may be executed in sequence, in parallel, or interleaved to determine each dead-time $t_{d1}$ and $t_{d2}$. Once the dead-times $t_{d1}$ and $t_{d2}$ (e.g., in operation 910 or 920) are identified, the dead-time sub-controller provides these new values to the digital PWM, and the voltage regulator begins operating with the new dead-time values. The method 900 also branches back to operation 912 where it waits for another trigger condition.

Alternatively to starting at the present operating dead-times when a trigger condition is detected, the new incremental searches may start from the same initial dead-time (e.g., $t_{dmax}$) or another predetermined initial dead-time depending on a particular trigger condition or detection of a particular change in the operating conditions of the voltage regulator.

The same hardware (e.g., a state machine) can be used to perform the initial search and both incremental up and/or down searches. In any case, it is clear that relatively small digital logic resources, or relatively simple code if the method is implemented in software, are needed to implement searches such as the algorithm illustrated in FIG. 9.

As an alternative to minimizing the steady-state duty-cycle command $D_c$ the method can make use of other suitable status signals derived in the controller from the error signal e. For example, the sign of the error signal e observed after an adjustment in a dead-time can be used in decision operation 908, 918, and/or 926 in the method of FIG. 9. In general, any signal indicative of the direction of change of the sensed output voltage caused by an adjustment in dead-time can be used in the method. A signal obtained by linear or non-linear filtering of the error signal e, for example, may be used as a status signal. As another example, the duty-cycle command $d_c$ observed at a suitable time after an adjustment in a dead-time can replace the steady-state duty-cycle command signal $D_c$ in the method.

The algorithm shown in FIG. 9 assumes that the search can be performed during a time in which the converter operates in a steady-state condition. In this embodiment, computing the corresponding steady-state duty-cycle command $D_c$ should not be affected by fast cycle-by-cycle changes in the duty cycle command $d_c$ due to load or input voltage transients. Several exemplary options may be used to determine the steady-state duty-cycle command $D_c$. For example, after a change in the dead-time command $t_{d1}$ or $t_{d2}$, the controller may wait for a sequence of consecutive zero error signals (e) (or error signals less than a predetermined threshold) indicating that the converter is operating in or near steady-state operation and then assign the current duty-cycle command $d_c$ as the steady-state duty-cycle command (i.e., $D_c=d_c[n]$, when $e[n]=e[n-1]=\ldots=e[n-k]=0$). Alternatively, after a change in a dead-time command $t_{d1}$ or $t_{d2}$, the controller may wait for a predetermined number of switching cycles, and then assign the current duty-cycle command $d_c$ as the steady-state duty-cycle command $D_c$. In yet another embodiment, the controller may compute the steady-state duty-cycle command $D_c$ by low-pass filtering the duty-cycle command $d_c$, such as by utilizing a moving average filter (e.g., $D_c[n]=\alpha D[n-1]+(1-\alpha)d_c[n]$, where the parameter $\alpha$ is between 0 and 1).

In any case, the execution of the algorithm shown in FIG. 9 requires a plurality of switching cycles.

Figure 10:
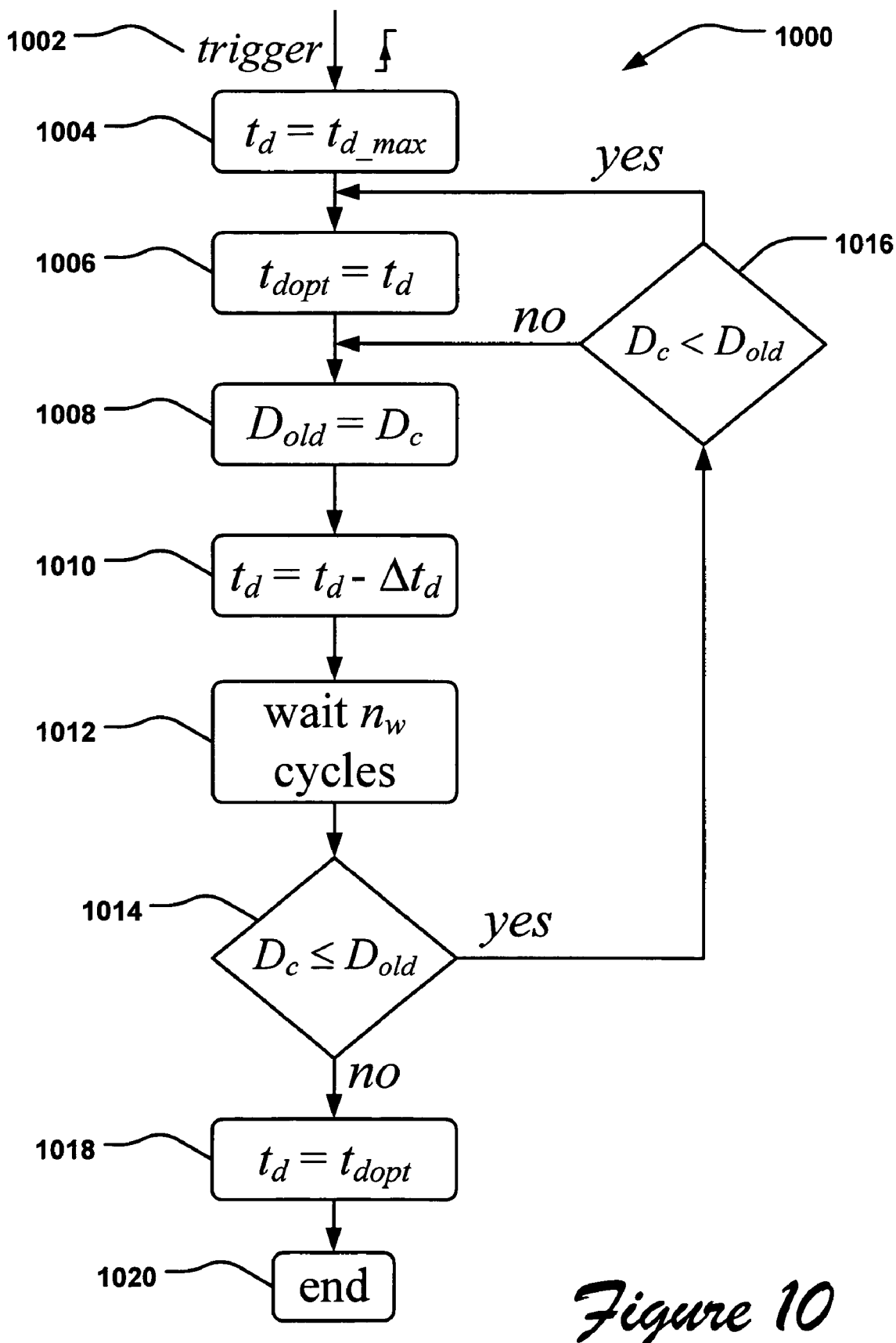
FIG. 10 illustrates a flow diagram of another exemplary method for determining a dead-time.

FIG. 10 illustrates another exemplary method 1000 for implementing a dead-time sub-controller, such as the dead-time sub-controllers 326 and 626 shown in FIGS. 3 and 6. Again, a digital implementation of the dead-time determination is performed as an exemplary simple digital search algorithm. This algorithm, however, is merely exemplary, and other implementations (digital, analog, or mixed-signal) or algorithms could readily be used to determine a dead-time for a particular set of operating parameters of a voltage regulator. The algorithm shows the determination of a single dead-time $t_d$. The same algorithm can be executed in sequence, in parallel, or interleaved to determine the dead-times $t_d=t_{d1}$ and $t_d=t_{d2}$ for the main power switch and the synchronous rectifier power switch, respectively.

The method first receives a trigger signal in operation 1002 that initiates a search for new dead-times for the present operating conditions of the voltage regulator. Upon receipt of the trigger signal, the method proceeds to assigning operation 1004 in which an initial value is assigned to a dead-time variable $t_d$. The initial value, for example, may comprise a sufficiently long dead-time $t_{dmax}$ to provide a safe starting point or may comprise a previously determined dead-time value from which a new search may begin. In further assignment operations 1006 and 1008, a temporary dead-time variable $t_{dopt}$ is assigned the present value of the dead-time variable $t_d$ in operation 1006 and a temporary steady-state duty-cycle command variable $D_{c-old}$ is assigned the present value of the steady-state duty-cycle command variable $D_c$ in operation 1008. The dead-time variable is then decremented in operation 1010 by an incremental step value $\Delta t_d$. The method then waits a predetermined number of switching cycles for the DC-DC converter in operation 1012 to ensure that the system has reached a new steady-state operation for each new step of the search. Alternatively, any other indication of steady-state operation, such as detecting one or more zero-error conditions, may be used to ensure that the system has achieved a steady-state operation.

The method then compares the value of the present steady-state duty-cycle command $D_c$ and the stored value of the previous temporary steady-state duty-cycle command variable $D_{c-old}$ in comparison operation 1014. If the present steady-state duty-cycle command $D_c$ is less than or equal to the stored value of the previous temporary steady-state duty-cycle command variable $D_{c-old}$ in the comparison operation 1014, the method branches to a secondary comparison operation 1016 in which the value of the present steady-state duty-cycle command $D_c$ is again compared to the stored value of the previous temporary steady-state duty-cycle command variable $D_{c-old}$. If the value of the present steady-state duty-cycle command $D_c$ is less than the stored value of the previous temporary steady-state duty-cycle command variable DC old, the secondary comparison operation 1016 branches to operation 1004 in which the temporary dead-time variable $t_{dopt}$ is assigned the present value of the dead-time variable $t_d$ and the method proceeds as described above. If the value of the present steady-state duty-cycle command $D_c$ is not less than the stored value of the previous temporary steady-state duty-cycle command variable $D_{c-old}$, however, the secondary comparison operation 1016 branches to operation 1006 in which the temporary dead-time variable $t_{dopt}$ is assigned the present value of the dead-time variable $t_d$ and the method proceeds as described above.

If the present steady-state duty-cycle command $D_c$ is not less than or equal to the stored value of the previous temporary steady-state duty-cycle command variable $D_{c-old}$ in the comparison operation 1014, however, the method branches to assignment operation 1018 in which the dead-time variable $t_d$ is assigned the value previously stored in the temporary dead-time variable $t_{dopt}$, and the method ends at operation 1020.

Although the embodiment of the method for determining dead-times shown in FIG. 10 proceeds each time from a safe maximum dead-time value, the method may alternatively start from another dead-time value (e.g., the present dead-time value) and then increment and/or decrement the value to search for a new dead-time value. Where the operating conditions of the voltage regulator circuit have not changed drastically, for example, starting from a previously determined dead-time value may save time required by the routine.

Where the output voltage produces an error signal at the input of the controller, the controller alters a duty-cycle of control signals driving power switches of the DC-DC converter to regulate the output voltage. In a digitally-controlled converter, however, no error signal will be generated as long as the output voltage stays inside a zero-error bin of an A/D converter of the controller, and the controller will not alter the duty-cycle of the control signals driving the power switches of the DC-DC converter. A small step change of the dead-time may not be sufficient to bring the output voltage outside of the zero-error bin range. Thus, a minimum change in the dead-time of approximately $t_{d-min}=V_q/(f_s V_D)$, is necessary, where $V_q$ comprises the width of the zero-error bin of the A/D converter that senses the output voltage, $V_D$ comprises the voltage drop across the body diode of the synchronous rectifier power switch, and $f_s$ is the switching frequency of the DC-DC converter. As the dead-time determination algorithm decrements the dead-time value in small steps, the output voltage increases gradually, until the output voltage goes outside of the zero-error bin of the A/D converter, and the A/D converter provides an error signal to the input of the compensator. In response, the compensator decreases the duty-cycle command. As shown in FIG. 10, decreasing the dead-time value continues as long as the present steady-state duty-cycle command $D_c$ is less than or equal to the previous value stored in the variable $D_{c\text{-}old}$. If the efficiency of the DC-DC converter is assumed to be predominantly affected by the body-diode conduction, the optimum efficiency is found within a tolerance that depends upon the precision of the output voltage regulation, $\Delta\eta = V_q/V_{out}$. The dead-time command value $t_d$, for which a decrease in the steady-state duty-cycle command $D_c$ is observed, is stored as the estimate of the optimum dead-time $t_{dopt}$. When an increase in the steady-state duty-cycle command $D_c$ is observed, the algorithm stops and assigns the last stored value for the dead-time variable $t_{dopt}$ as the dead-time $t_d$ for the current operating conditions of the voltage regulator (e.g., $t_{d1}$ or $t_{d2}$).

Figure 11:
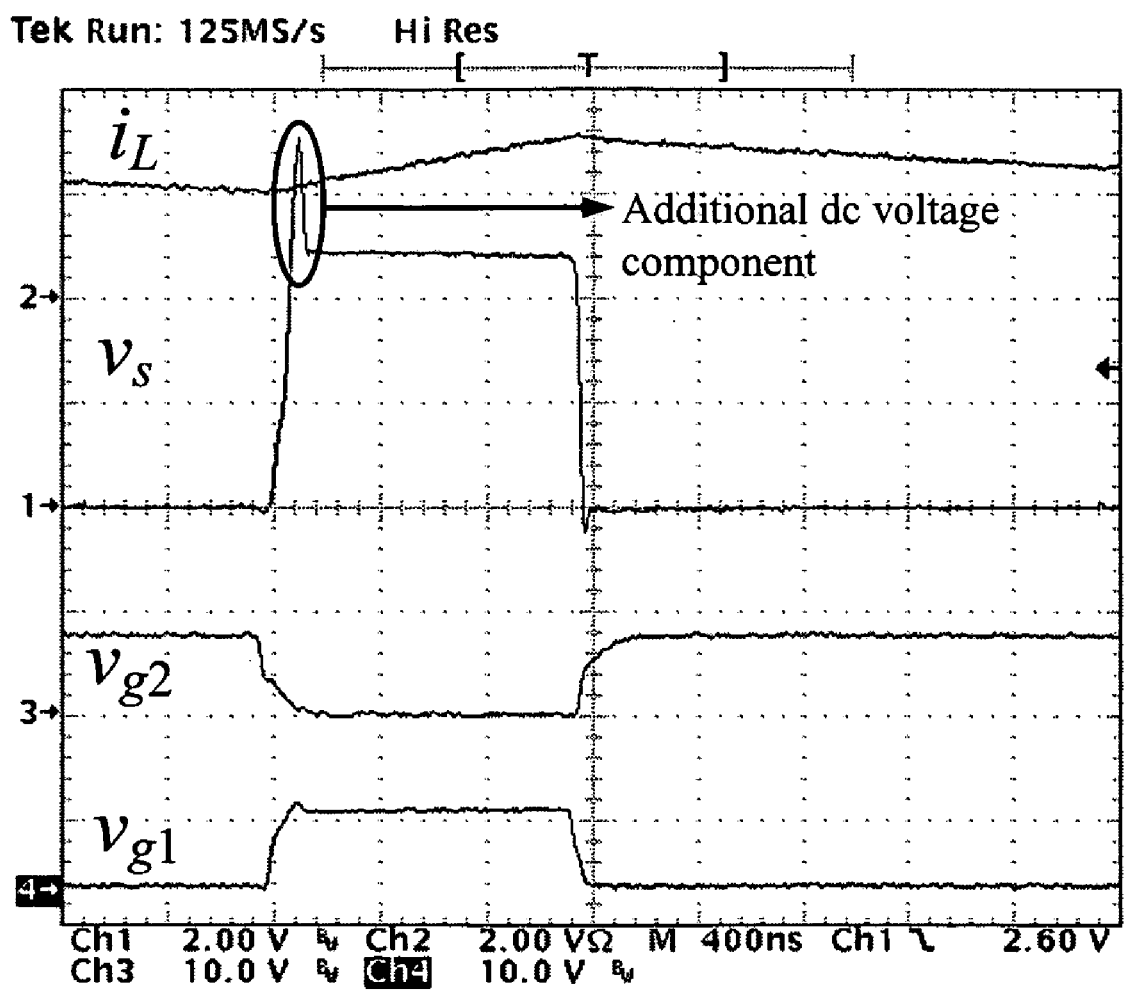
FIG. 11 illustrates exemplary waveforms of a synchronous rectifier power switch for gate-drive control signals having too-short of a dead-time.

When the dead-time $t_d$ is too short, the switch node voltage Vs differs from the idealized waveform of FIG. 4(a) because of parasitic inductances in the loop comprising the main power switch and the synchronous rectifier power switch such that a slight overlap in the conduction of the two switches may provide a "shoot-through" current through the parasitic inductance and the two switches. Once a switch is turned off, the energy stored in the parasitic inductance is released in a ringing waveform across the switch node parasitic capacitance. This release of energy from the parasitic inductance appears as an increase in the average value of the switch node voltage, as illustrated by the waveforms shown in FIG. 11. This additional voltage component caused by the release of energy stored in the parasitic inductance in series with the switches tends to compensate for the reduction in the average switch node voltage caused by the slight overlap in conduction. As a result, a plot of the steady-state duty-cycle command $D_c$ as a function of dead-time has a shallower minimum compared to the efficiency that exhibits a sharp drop when the overlap conduction occurs. To mitigate this problem, an algorithm, such as the ones shown in FIGS. 9 and 10, may start at a safe maximum dead-time value (e.g., $t_{dmax}$) and stop at the point where the last decrease in the steady-state duty-cycle command $D_c$ is observed. As a result, these particular algorithms may avoid operation close to the overlap conduction of the power switches and achieve a near-optimum efficiency performance.

Figure 12:
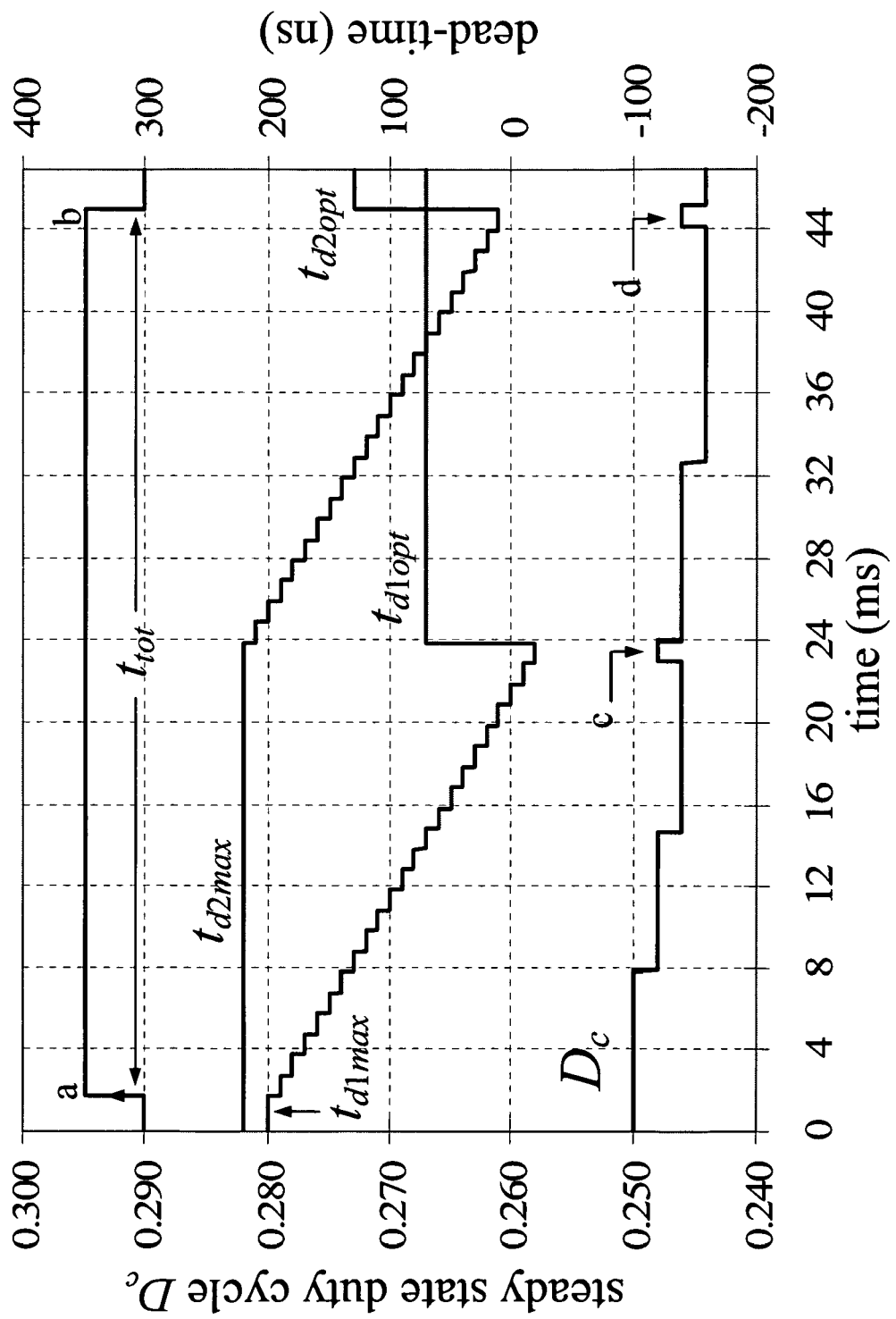
FIG. 12 illustrates exemplary experimental waveforms representing operations of an exemplary digital implementation of the exemplary algorithm shown in FIG. 10.

FIG. 12 shows exemplary experimental digital data collected from an FPGA implementation of a digital controller during the algorithm shown in FIG. 10. The waveforms illustrate a search for the dead-time commands $t_{d1}$ and $t_{d2}$ and the resulting changes in the steady-state duty-cycle command $D_c$. The trigger shown in FIG. 10 is received prior to time zero of the waveforms shown in FIG. 12, and the dead-time search algorithm for $t_d$, starts at point "a" by decreasing the value of $t_{d1}$ with a step change $\Delta t_d=10$ ns from the initial dead-time value $t_{d1max}$. Where the steady-state duty-cycle command $D_c$ decreases, the value of $t_{d1}$ is stored in a $t_{dopt}$ register. At point "c," the dead-time is too short, which results in a decrease of the average voltage of the switch node voltage $V_s$. As a result, the compensator increases the value of the duty-cycle command $d_c$, which is shown at point "c" in FIG. 12. At this time, the search algorithm for $t_{d2}$ is triggered automatically, and the $t_{d2}$ search proceeds.

Figure 13:
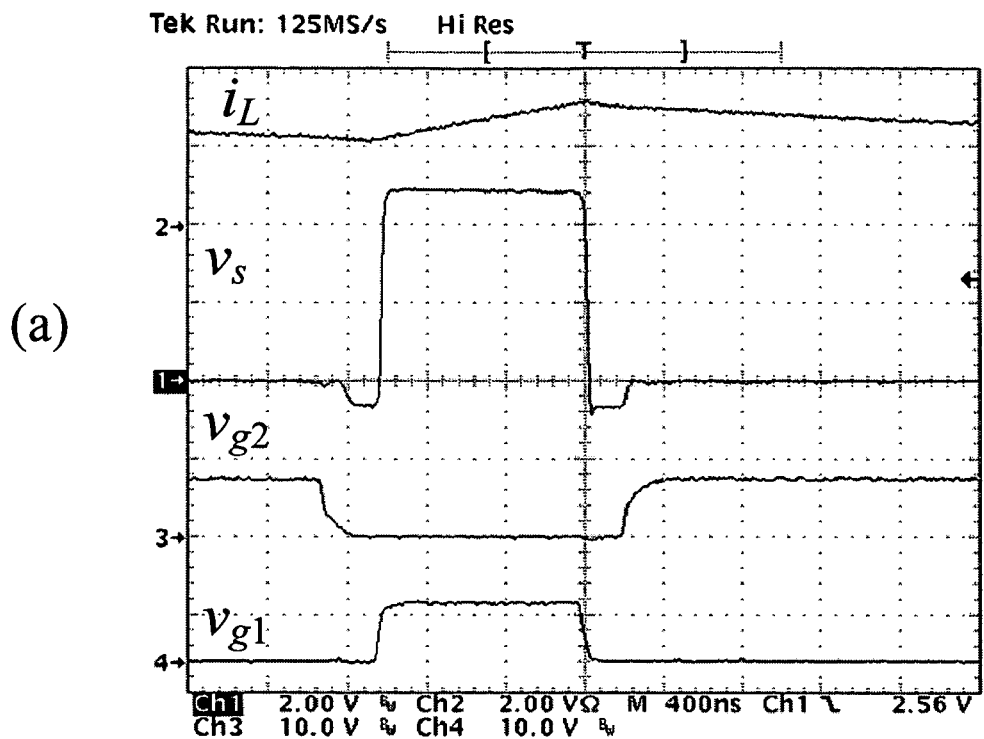
FIGS. 13(a) and 13(b) illustrate exemplary experimental waveforms representing operation of an exemplary voltage regulator before dead-time determination according to one aspect of the present invention and after dead-time determination according to that aspect of the present invention, respectively.
Figure 13:
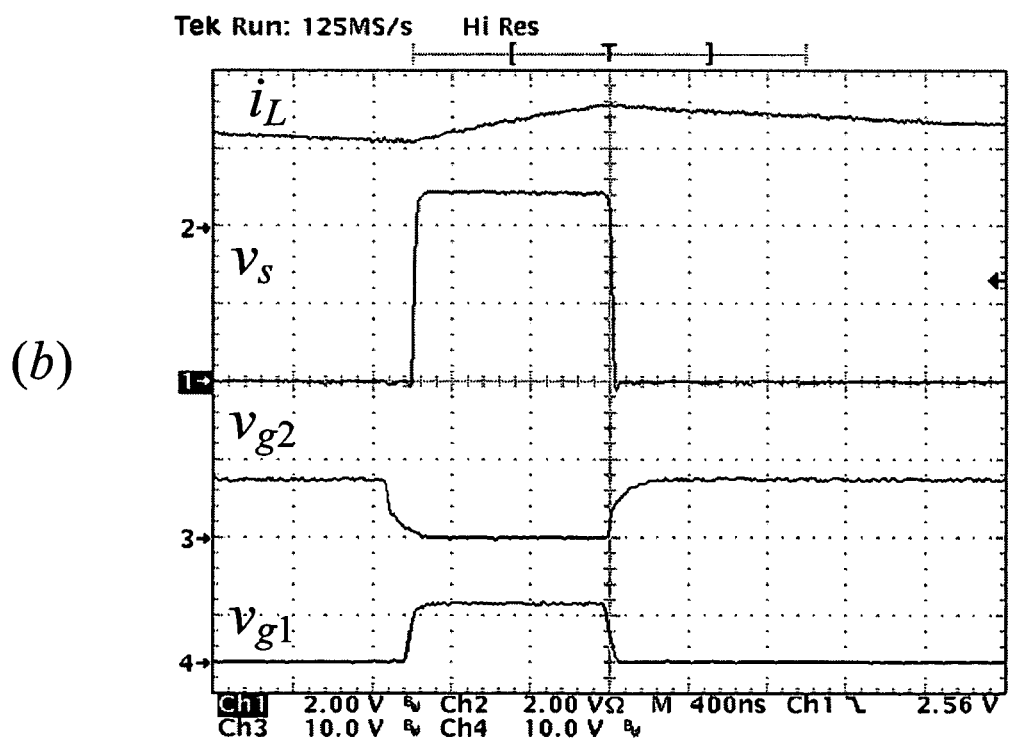

FIGS. 13(a) and 13(b) show exemplary experimental waveforms for an embodiment of the voltage regulator 600 shown in FIG. 6 before dead-time determination according to one aspect of the present invention and after that dead-time determination, respectively. In this embodiment, the voltage regulator 600 shown in FIG. 6 comprises a converter input voltage $V_g=5$ volts, an output voltage $V_{out}=1$ volt, filter elements L=4.3 µH and C=705 µF, a switching frequency of 200 kHz, and a load current $I_{out}=0\sim5$ A. In this embodiment, the step change used in the algorithm $\Delta t_d=10$ ns is due to the limitation of the switching frequency on the FPGA implementation of the regulator. With digital PWM controller ICs, however, higher switching frequencies, such as in the MHz range with sub-nanosecond resolution for the duty-cycle and dead time commands $t_{d1}$ and $t_{d2}$ can be readily achieved.

As described above, the algorithm may be triggered by different events that indicate changes or potential changes in operating conditions of the voltage regulator. The algorithm, for example, may be triggered upon start-up or when significant changes in operating conditions of the regulator indicate that the change in operating conditions are likely to result in changes in efficient dead-times for those conditions. A transient in the duty-cycle command $d_c$ may, for example, be used as an indication of a change in the operating conditions of the regulator. In this embodiment, the trigger signal that initiates the algorithm may be produced when a difference between the duty-cycle command $d_c$ and the steady-state duty-cycle command $D_c$ is observed. The time duration when the steady-state value DC differs from the real-time duty-cycle command $d_c$ may be considered as a transient time in which the corresponding signal trans is generated as follows:

trans=1 for $D_c \neq d_c$, and trans=0 for $D_c = d_c$.

Figure 14:
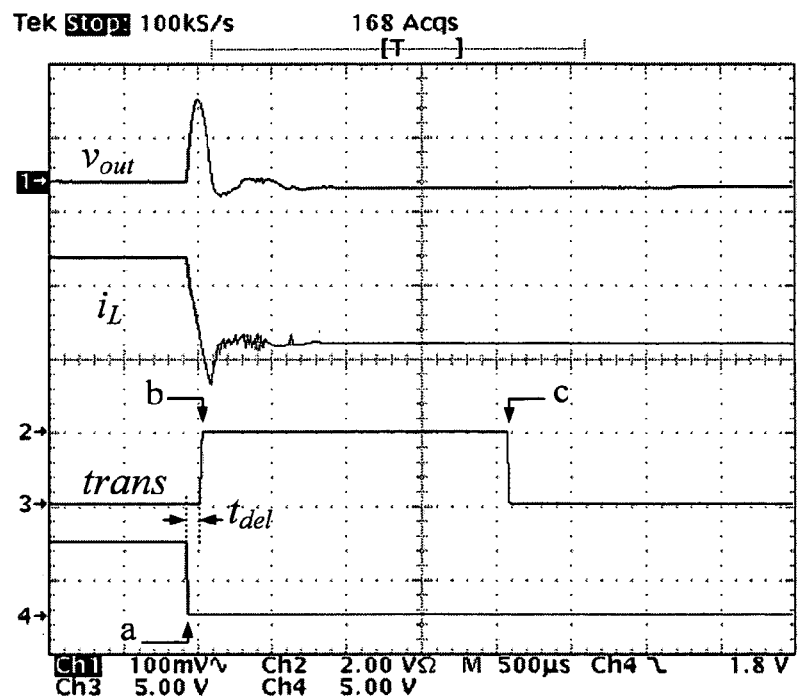
FIG. 14 illustrates exemplary experimental load transient response waveforms showing an exemplary transient detection of a DC-DC converter.

Experimental load transient response waveforms in FIG. 14 show an exemplary transient detection of a DC-DC converter. A step load change from a first load (e.g., a full 5 A load) to a second load (e.g., a half load of 2.5 A) occurs at the point "a." At this point, the compensator generates time-varying duty-cycle commands $d_c$ to bring the output voltage back in regulation. In generating the trans signal as described above, a small time delay $t_{del}$ is introduced to disable detection of small transients, which may be produced by the dead-time algorithm itself. In this example, at the rising edge of the signal trans (i.e., at point "b" in FIG. 14), the dead-times $t_{d1}$ and $t_{d2}$ are increased to their maximum values. At the falling edge (i.e., point "c"), the system is in a new steady-state (i.e., $D_c=d_c$). At this time, the dead-time algorithm is enabled, and the search proceeds as illustrated by the waveforms in FIG. 12.

Figure 15:
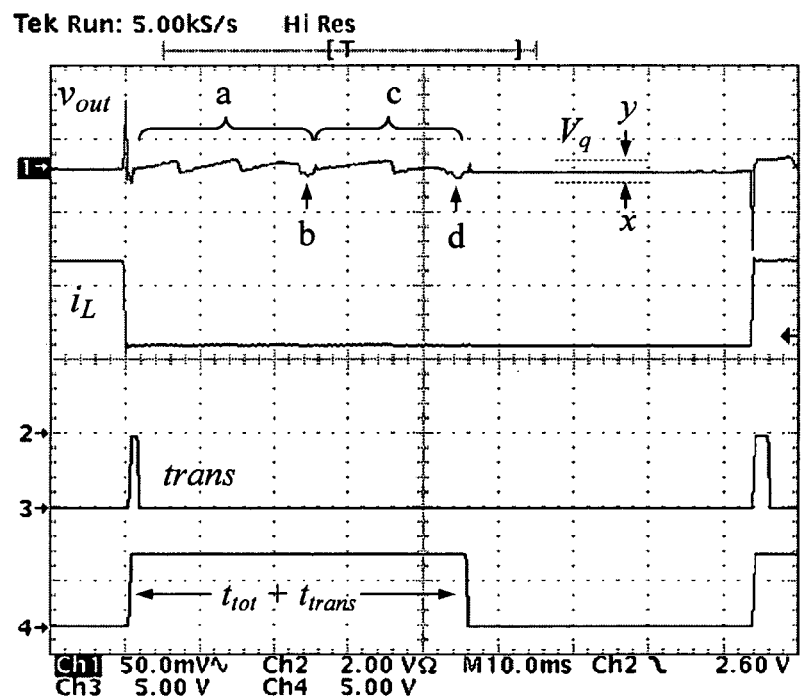
FIG. 15 illustrates exemplary experimental waveforms representing dead-time determination initiated dynamically by the load transient shown in FIG. 14.

FIG. 15 shows exemplary experimental waveforms during the entire length of the dead-time determination initiated dynamically by the same load transient as shown in FIG. 14. The time interval "a" shown in FIG. 15 corresponds to the search for dead-time $t_{d1}$, and the time interval "c" corresponds to the search for the dead-time $t_{d2}$. The range of $V_q$ corresponds to the zero-error bin of the A/D converter sensing the output voltage $V_{out}$. The upper edge of the zero-error bin is denoted as y, and the lower edge as x. The dead-time determination algorithm of $t_d$ is initiated at the falling edge of the signal trans. As shown in FIG. 12, the dead-time $t_{d1}$ starts decreasing, and as a result the output voltage $V_{out}$ starts increasing. As long as the output voltage $V_{out}$ is inside the zero-error bin of the A/D converter, no error is detected by the compensator, and the duty-cycle command dc remains the same. As the dead-time $t_{d1}$ is decreased further, the output voltage $V_{out}$ crosses the upper edge y of the zero-error bin of the A/D converter. This can be seen, for example, in the small perturbations of the output voltage as the dead-time determination search algorithm proceeds. At the point "b" of FIG. 15, the dead-time $t_d$, is too short and the output voltage $V_{out}$ decreases and hits the lower edge x of the zero-error bin of the A/D converter. The compensator, in turn, increases the value of the duty-cycle command dc to bring the output voltage $V_{out}$ back into regulation. This is detected by the dead-time determination algorithm for the dead-time $t_{d1}$, which sets the dead-time command to the value $t_{d1opt}$, and triggers the search for the second dead-time $t_{d2}$. Following the same steps as for the first dead-time search algorithm, the second dead-time algorithm for dead-time $t_{d2}$ starts at point "b," and ends at point "d."

Although embodiments of this invention have been described above with a certain degree of particularity, those skilled in the art could make numerous alterations to the disclosed embodiments without departing from the spirit or scope of this invention. For example, although the embodiment shown in FIG. 3 comprises a digital implementation of a voltage-mode PWM controller, other implementations such as analog or mixed-signal controllers, current-mode controllers, or even other modulation techniques such as pulse-amplitude-modulation or pulse-frequency modulation could be used. All directional references (e.g., upper, lower, upward, downward, left, right, leftward, rightward, top, bottom, above, below, vertical, horizontal, clockwise, and counter-clockwise) are only used for identification purposes to aid the reader's understanding of the present invention, and do not create limitations, particularly as to the position, orientation, or use of the invention. Joinder references (e.g., attached, coupled, connected, and the like) are to be construed broadly and may include intermediate members between a connection of elements and relative movement between elements. As such, joinder references do not necessarily infer that two elements are directly connected and in fixed relation to each other. It is intended that all matter contained in the above description or shown in the accompanying drawings shall be interpreted as illustrative only and not limiting. Changes in detail or structure may be made without departing from the spirit of the invention as defined in the appended claims.

What is claimed is:

1. A controller capable of regulating a substantially DC signal at the output of a switched-mode DC-DC converter comprising a pair of power switches, the controller comprising:
   an input capable of receiving a substantially DC feedback signal from the output of the switched-mode DC-DC converter;
   a DC reference generator capable of providing a DC reference signal;
   a comparator configured to receive said substantially DC feedback signal and said DC reference signal, and capable of providing an analog error signal a digital error signal based at least in part upon a difference between said substantially DC feedback signal and said DC reference signal;
   an analog to digital converter configured to receive said analog error signal and generate a digital error signal based upon said analog error signal;
   a compensator capable of receiving said digital error signal and capable of providing a time-varying duty-cycle command and a digital status signal indicative of the direction of change of said substantially DC feedback signal based at least in part upon said digital error signal;
   a dead-time sub-controller configured to receive said digital status signal and configured to determine a pair of dead-time commands based at least in part upon an algorithm minimizing said digital status signal, wherein said algorithm is implemented through either hardware logic or software; and
   a modulator capable of receiving said time-varying duty-cycle command and said pair of dead-time commands, and capable of determining a pair of power switch control signals based at least in part upon said time-varying duty-cycle command and said pair of dead-time commands.

2. The controller of claim 1, wherein said feedback signal comprises an output voltage of the switched-mode DC-DC converter, and said DC reference signal comprises a reference voltage.

3. The controller of claim 1, wherein said feedback signal comprises an output current of the switched-mode DC-DC converter, and said DC reference signal comprises a reference current.

4. The controller of claim 1, wherein said digital status signal comprises a steady-state duty-cycle command.

5. The controller of claim 4, wherein said compensator is capable of determining said steady-state duty-cycle command at least in part via a digital low pass filter.

6. The controller of claim 1, wherein said digital status signal comprises one of an average duty-cycle command, an instantaneous value of said time-varying duty-cycle command, a signal obtained by linear filtering of said digital error signal, and a signal obtained by non-linear filtering of said digital error signal.

7. The controller of claim 1, wherein said dead-time sub-controller is capable of receiving said time-varying digital duty-cycle command, and capable of determining said pair of dead-time commands based at least in part upon said digital status signal and said time-varying digital duty-cycle command.

8. The controller of claim 1, wherein said modulator comprises a pulse-width modulator.

9. The controller of claim 1, further comprising a switched-mode DC-DC converter comprising:
   an output coupled to said input of the controller; and
   a pair of power switches coupled to said modulator of the controller via a corresponding pair of gate drive circuits.

10. The controller of claim 9, wherein each of said corresponding pair of gate drive circuits drive a corresponding one of said pair of power switches via said pair of power switch control signals.

11. The controller of claim 1, wherein said dead-time sub-controller comprises a sensorless dead-time sub-controller.

12. A controller capable of regulating a substantially DC output signal in a switched-mode DC-DC converter comprising a pair of power switches, the controller comprising:
   an input capable of receiving a substantially DC feedback signal from the switched-mode DC-DC converter;
   a sensorless dead-time sub-controller capable of determining a pair of dead-time commands based at least in part upon the substantially DC feedback signal received at said input; and
   a control signal generator sub-controller capable of generating a pair of power switch control signals to regulate the pair of switches of the switched-mode DC-DC converter based at least in part upon the substantially DC feedback signal, and/or the pair of dead-time commands.

13. The controller of claim 12, wherein the substantially DC feedback signal comprises an output voltage of the switched-mode DC-DC converter.

14. The controller of claim 12, wherein the substantially DC feedback signal comprises an output current of the switched-mode DC-DC converter.

15. The controller of claim 12, wherein said control signal generator sub-controller comprises a digital control signal generator.

16. The controller of claim 12, wherein said control signal generator sub-controller comprises an analog control signal generator.

17. The controller of claim 12, further comprising a switched-mode DC-DC converter comprising:
   an output coupled to said input of the controller; and
   a pair of power switches coupled to said control signal generator of the controller via a corresponding pair of gate drive circuits.

18. The controller of claim 17, wherein each of said corresponding pair of gate drive circuits drive a corresponding one of said pair of power switches via said pair of power switch control signals.

19. A method of determining dead-times of control signals for a switched-mode DC-DC converter comprising a pair of power switches, the method comprising:
   determining a first digital status signal corresponding to a first dead-time command value, wherein said first digital status signal is based at least in part on a substantially DC feedback signal sensed after an output filter of the switched-mode DC-DC converter;
   adjusting the first dead-time command value by a step change to obtain a second dead-time command value;
   determining a second digital status signal corresponding to the second dead-time command value, wherein said second digital status signal is based at least in part on a substantially DC feedback signal sensed after an output filter of the switched-mode DC-DC converter;
   comparing the first digital status signal and the second digital status signal; and
   if the second digital status signal is greater than the first digital status signal, selecting a dead-time command corresponding to the first dead-time command value.

20. The method of claim 19, wherein the adjusting operation comprises decrementing the first dead-time command value.

21. The method of claim 19, wherein the adjusting operation comprises incrementing the first dead-time command value.

22. The method of claim 19, further comprising:
   if the second digital status signal is not greater than the first digital status signal; adjusting the second dead-time command value by a step change to obtain a third dead-time command value; determining a third digital status signal corresponding to the third dead-time command value; and comparing the second digital status signal and the third digital status signal.

23. The method of claim 22, further comprising, if the third digital status signal is greater than the first digital status signal, selecting a dead-time command corresponding to the second dead-time command value.

24. The method of claim 19, wherein the first dead-time command value corresponds to a maximum dead-time command value.

25. The method of claim 19, wherein the first dead-time value corresponds to a prior dead-time command value.

26. The method of claim 19, wherein the method is initiated in response to receiving a trigger signal.

27. The method of claim 19, wherein the method is initiated in response to a trigger event.

28. The method of claim 19, wherein the first digital status signal comprises a first steady-state duty-cycle command.

29. The method of claim 28, wherein the second digital status signal comprises a second steady-state duty-cycle command.

30. The method of claim 29, wherein the first digital status signal comprises at least one of an average duty-cycle command, an instantaneous value of said time-varying duty-cycle command, a signal obtained by linear filtering of an error signal, and a signal obtained by non-linear filtering of said error signal.

31. The method of claim 30, wherein the second digital status signal comprises at least one of an average duty-cycle command, an instantaneous value of said time-varying duty-cycle command, a signal obtained by linear filtering of an error signal, and a signal obtained by non-linear filtering of said error signal.

32. A method of controlling a switched-mode DC-DC converter comprising a pair of power switches, the method comprising:
   receiving a substantially DC feedback signal from an output of a switched-mode DC-DC converter;
   providing a digital error signal based at least in part upon a difference between the substantially DC feedback signal and a substantially DC reference signal;
   determining a time-varying duty-cycle command, and a digital status signal based at least in part upon the digital error signal;
   determining a pair of dead-time commands based at least in part upon said digital status signal; and
   generating a pair of control signals based at least in part upon the time-varying duty-cycle and/or the pair of dead-time commands.

33. The method of claim 32, wherein the digital status signal comprises a steady-state duty-cycle command.

34. The method of claim 32, wherein said digital status signal comprises at least one of an average duty-cycle command, an instantaneous value of said time-varying duty-cycle command, a signal obtained by linear filtering of said digital error signal, and a signal obtained by non-linear filtering of said digital error signal.

35. A controller capable of regulating a substantially DC signal at the output of a switched-mode DC-DC converter comprising a pair of power switches, the controller comprising:
   an input configured to receive a substantially DC feedback signal from the output of the switched-mode DC-DC converter;
   a DC reference generator providing a DC reference signal;
   an analog-to-digital converter capable of receiving said substantially DC feedback signal and said DC reference signal, and capable of providing a substantially DC error signal based upon a difference between said substantially DC feedback signal and said DC reference signal;
   a compensator configured to receive said substantially DC error signal and provide a time-varying duty-cycle command and a digital status signal indicative of the direction of change of said substantially DC feedback signal based at least in part upon said substantially DC error signal;
   a dead-time sub-controller configured to receive said digital status signal and to determine a pair of dead-time commands based upon said digital status signal; and
   a control signal generator configured to receive said time-varying duty-cycle command and said pair of dead-time commands, and configured to determine a pair of power switch control signals based at least in part upon said time-varying duty-cycle command and said pair of dead-time commands.

36. A controller capable of regulating a substantially DC output signal in a switched-mode DC-DC converter comprising a pair of power switches, the controller comprising:
  an input capable of receiving a substantially DC feedback signal from the switched-mode DC-DC converter;
  a sensorless dead-time determination means capable of determining a pair of dead-time commands based at least in part upon the substantially DC feedback signal received at said input; and
  a control signal generator means capable of generating a pair of control signals to regulate the pair of switches of the switched-mode DC-DC converter based at least in part upon the substantially DC feedback signal and the pair of dead-time commands.

37. A switched-mode DC-DC power converter system comprising:
  a switched-mode DC-DC converter comprising first and second power switches and an output filter connected to the output of said first and second power switches, wherein said switched-mode DC-DC converter has a DC output at the output of said output filter, and wherein said switched-mode DC-DC converter is configured to regulate a substantially DC output signal at said DC output;
  a controller electrically connected to said DC output, said controller configured to receive said substantially DC output signal from said DC output of said switched-mode DC-DC converter; wherein said controller is in electrical communication with said first and second power switches of said switched-mode DC-DC converter, wherein said controller is configured to provide first and second control signals for controlling the switching of said first and second power switches, respectively; and,
  wherein said controller is further configured to generate said first and second control signals based at least in part upon a pair of dead-time commands that are based at least in part upon said substantially DC output signal and using an algorithm that is configured to optimize said pair of dead-time commands based at least in part on the substantially DC output signal.

* * * * *

UNITED STATES PATENT AND TRADEMARK OFFICE
CERTIFICATE OF CORRECTION

PATENT NO. : 7,456,620 B2
APPLICATION NO. : 11/295147
DATED : November 25, 2008
INVENTOR(S) : Dragan Maksimovic et al.

It is certified that error appears in the above-identified patent and that said Letters Patent is hereby corrected as shown below:

Claim 1 col. 17 lines 53-54, delete "a digital error signal".

Signed and Sealed this

Fourteenth Day of April, 2009

JOHN DOLL
*Acting Director of the United States Patent and Trademark Office*